US012113735B2

(12) United States Patent
Bae et al.

(10) Patent No.: US 12,113,735 B2
(45) Date of Patent: Oct. 8, 2024

(54) METHOD FOR TRANSMITTING DATA ON PHYSICAL SHARED CHANNEL IN WIRELESS COMMUNICATION SYSTEM, AND DEVICE FOR SAME

(71) Applicant: LG ELECTRONICS INC., Seoul (KR)

(72) Inventors: Duckhyun Bae, Seoul (KR); Huayue Song, Seoul (KR); Yunjung Yi, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 617 days.

(21) Appl. No.: 17/282,466

(22) PCT Filed: Nov. 4, 2019

(86) PCT No.: PCT/KR2019/014869
§ 371 (c)(1),
(2) Date: Apr. 2, 2021

(87) PCT Pub. No.: WO2020/091579
PCT Pub. Date: May 7, 2020

(65) Prior Publication Data
US 2021/0385036 A1   Dec. 9, 2021

Related U.S. Application Data

(60) Provisional application No. 62/825,944, filed on Mar. 29, 2019.

(30) Foreign Application Priority Data

Nov. 2, 2018   (KR) .................. 10-2018-0133945

(51) Int. Cl.
*H04W 72/0446*   (2023.01)
*H04L 5/00*   (2006.01)

(52) U.S. Cl.
CPC ....... *H04L 5/0048* (2013.01); *H04W 72/0446* (2013.01)

(58) Field of Classification Search
CPC ......... H04W 56/0005; H04W 72/0453; H04W 52/146; H04L 5/0007; H04L 5/0044
(Continued)

(56) References Cited

U.S. PATENT DOCUMENTS 11,159,270 B2 * 10/2021 Khoshnevisan ...... H04L 1/0026
11,510,229 B2 * 11/2022 Liu .................... H04W 52/146
(Continued)

FOREIGN PATENT DOCUMENTS

EP          2654337 A1 * 10/2013 ........ H04W 56/0005
KR      1020180111921      10/2018
WO      WO2017217805      12/2017

OTHER PUBLICATIONS

M. Elsaadany, A. Ali and W. Hamouda, "Cellular LTE-A Technologies for the Future Internet-of-Things: Physical Layer Features and Challenges," in IEEE Communications Surveys & Tutorials, vol. 19, No. 4, pp. 2544-2572, Fourthquarter 2017, doi: 10.1109/COMST. 2017.2728013. (Year: 2017).*

(Continued)

*Primary Examiner* — William D Cumming
(74) *Attorney, Agent, or Firm* — Fish & Richardson P.C.

(57) ABSTRACT

A user equipment (UE), configured to transmit data on a physical shared channel, transmits the data using the allocated first physical shared channel to the base station, the data may be transmitted repeatedly as much as the number of the first physical shared channel on a physical shared channel group including a predetermined number of the first physical shared channels, a first dedicated demodulation-Reference Signal (DMRS) for the data may be mapped to a symbol constructing the physical shared channel group (Continued)

according to the mapping information and transmitted to the base station, and the mapping information may be information for mapping a second DMRS for a second physical shared channel including symbols of a same number as a symbol number constructing the physical shared channel group.

15 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,516,882 | B2* | 11/2022 | Sun | H04L 5/0053 |
| 11,638,236 | B2* | 4/2023 | Li | H04W 72/25 |
| | | | | 370/329 |
| 11,737,081 | B2* | 8/2023 | Moon | H04L 1/0038 |
| | | | | 370/329 |
| 2017/0264408 | A1 | 9/2017 | Patel et al. | |
| 2020/0153543 | A1* | 5/2020 | Khoshnevisan | H04L 27/261 |
| 2021/0068130 | A1* | 3/2021 | Liu | H04W 72/0453 |
| 2021/0385036 | A1* | 12/2021 | Bae | H04L 5/0044 |
| 2021/0385826 | A1* | 12/2021 | Moon | H04L 1/00 |
| 2022/0030552 | A1* | 1/2022 | Li | H04W 72/0453 |
| 2022/0183004 | A1* | 6/2022 | Huang | H04L 5/0007 |
| 2022/0287061 | A1* | 9/2022 | Huang | H04L 5/0044 |
| 2022/0394601 | A1* | 12/2022 | Zhang | H04L 1/08 |
| 2023/0232396 | A1* | 7/2023 | Park | H04W 72/21 |
| | | | | 370/329 |

OTHER PUBLICATIONS

Panasonic, "On NR URLLC L1 enhancements," R1-1810474, 3GPP TSG RAN WG1 Meeting #94bis, Chengdu, China, dated Oct. 8-12, 2018, 9 pages.
Panasonic, "URLLC enhanced grant-free transmission," R1-1810731, 3GPP TSG RAN WG1 Meeting #94bis, Chengdu, China, dated Oct. 8-12, 2018, 5 pages.
PCT International Search Report in International Appln. No. PCT/KR2019/014869, dated Feb. 25, 2020, 5 pages (with English translation).

* cited by examiner

[Fig. 1]
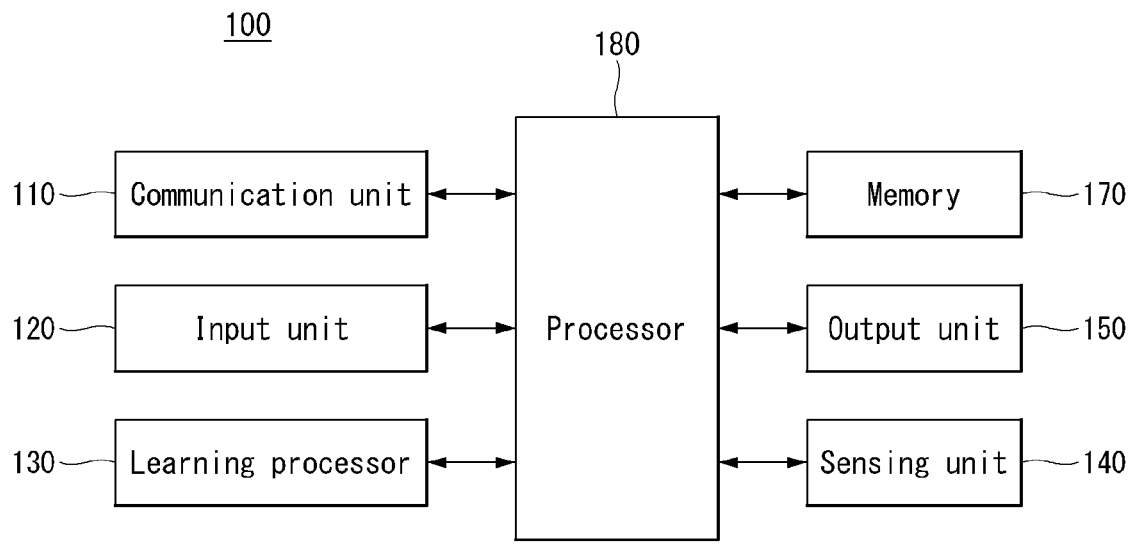
[Fig. 2]
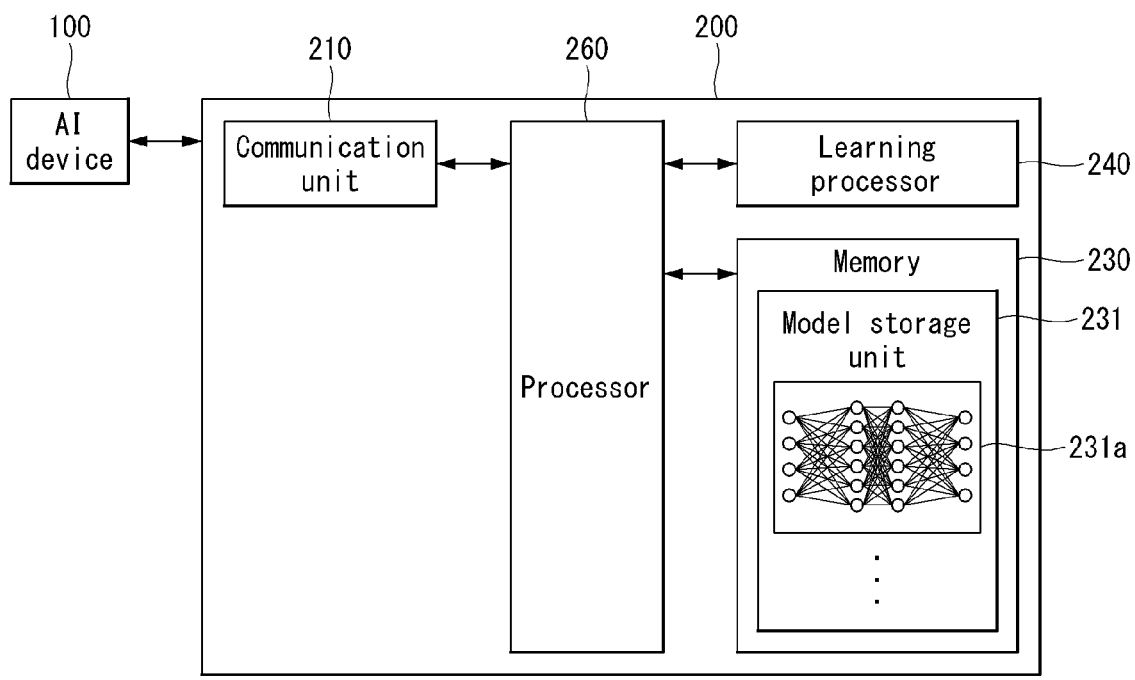

[Fig. 3]
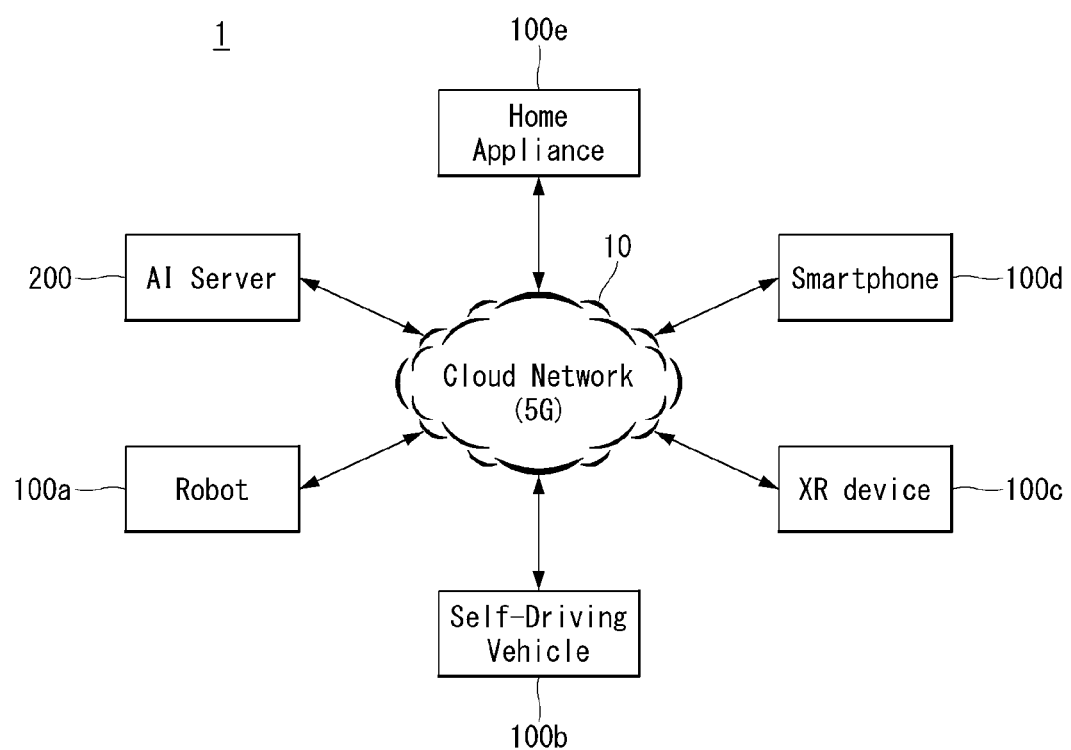

[Fig. 4]
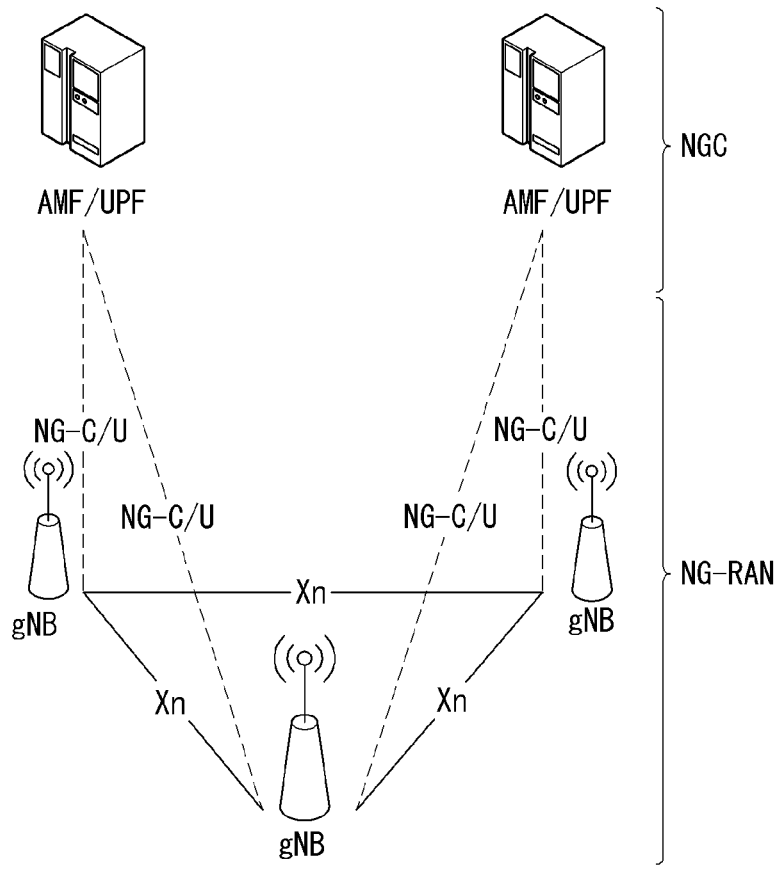
[Fig. 5]
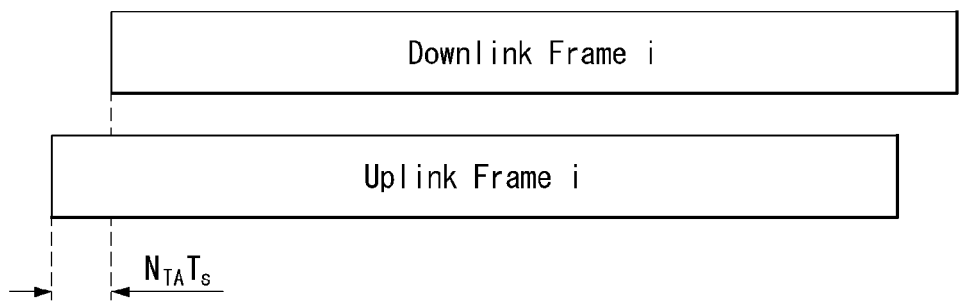

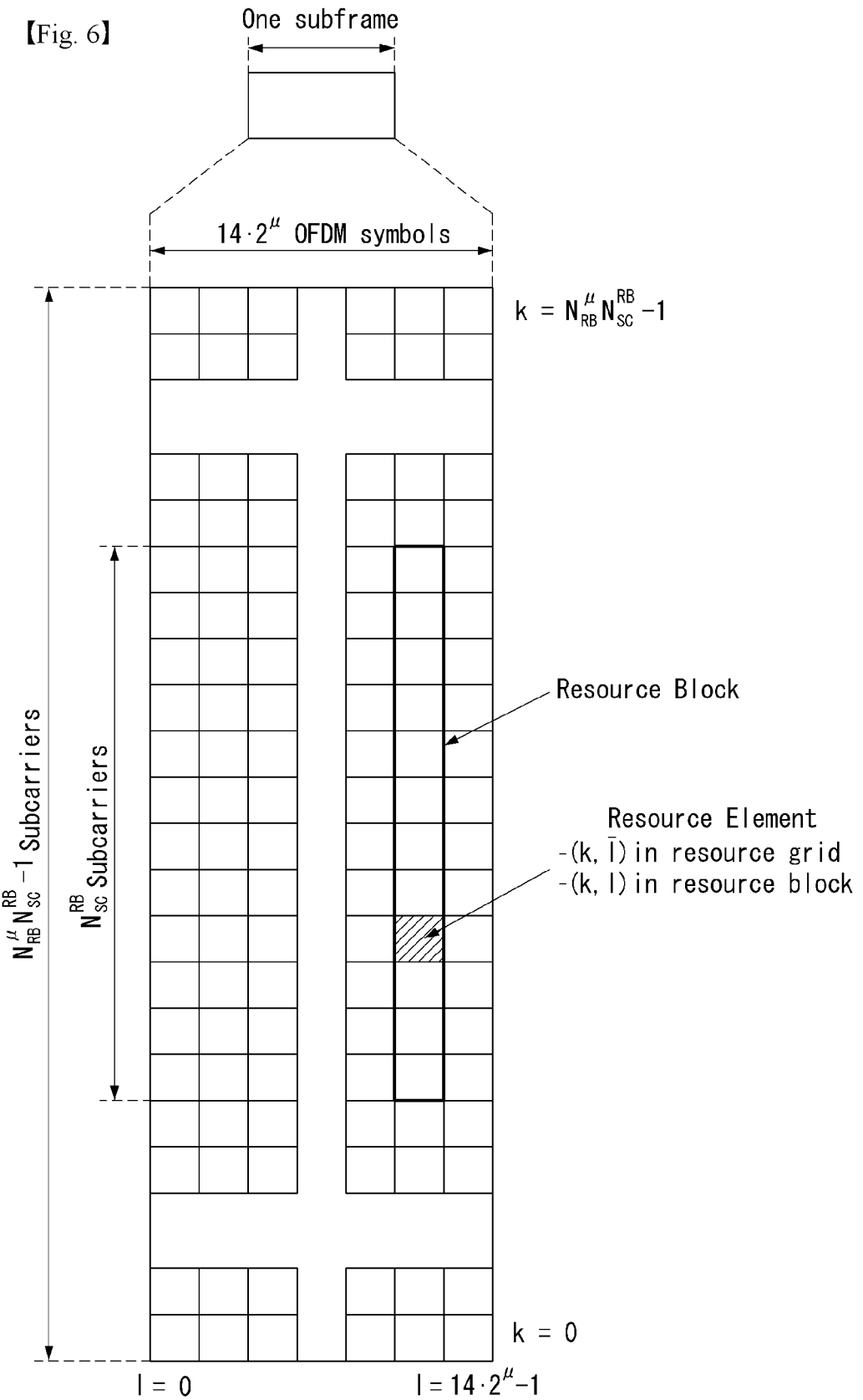
[Fig. 6]

[Fig. 7]
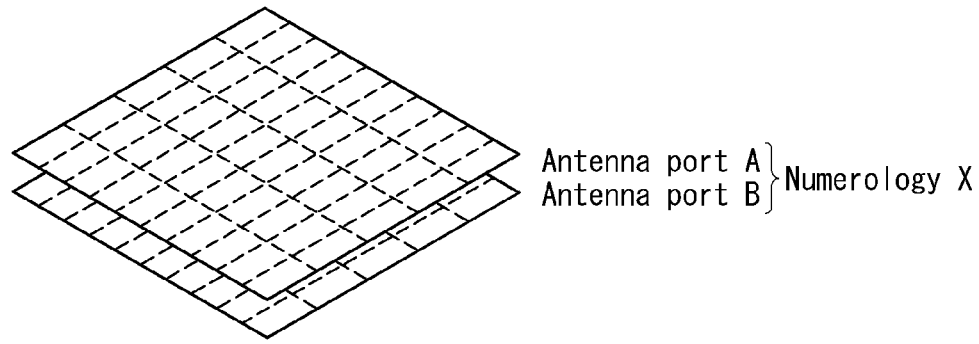
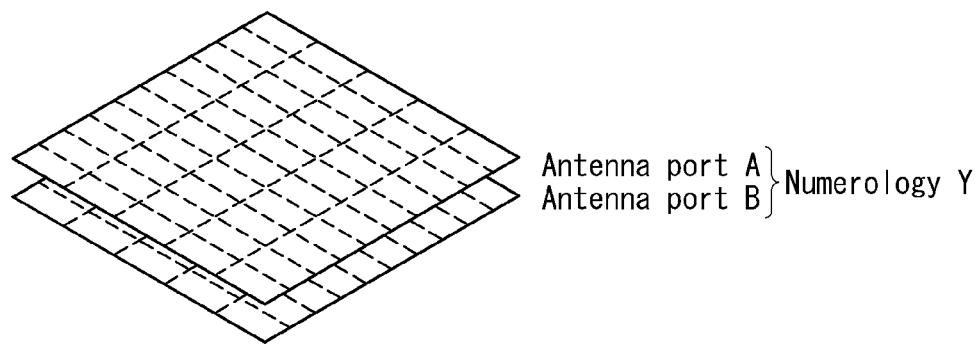
[Fig. 8]
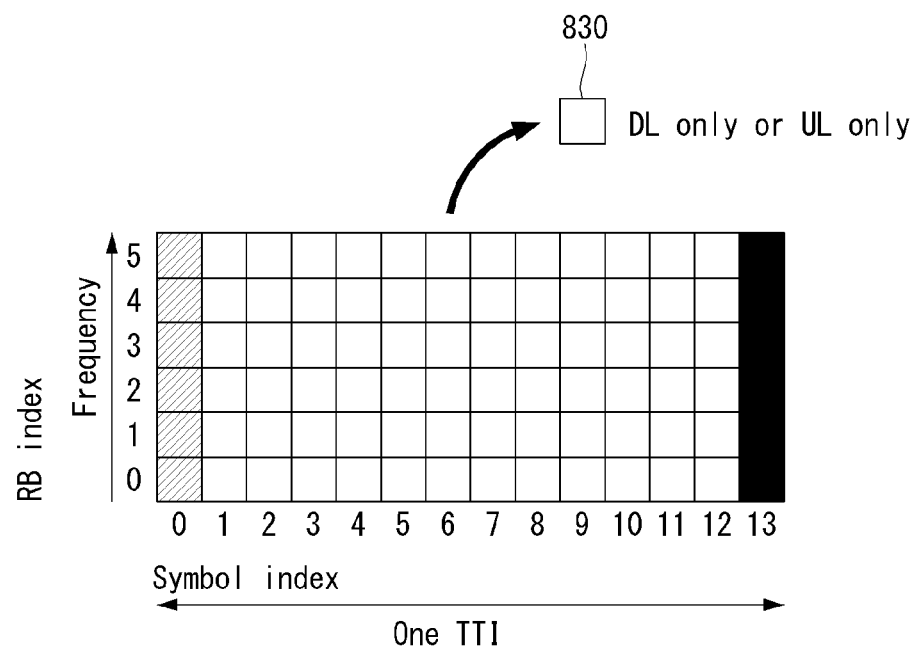

[Fig. 9]
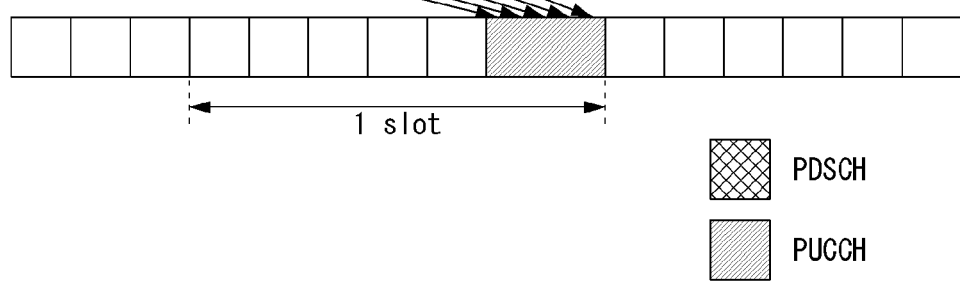
(a)
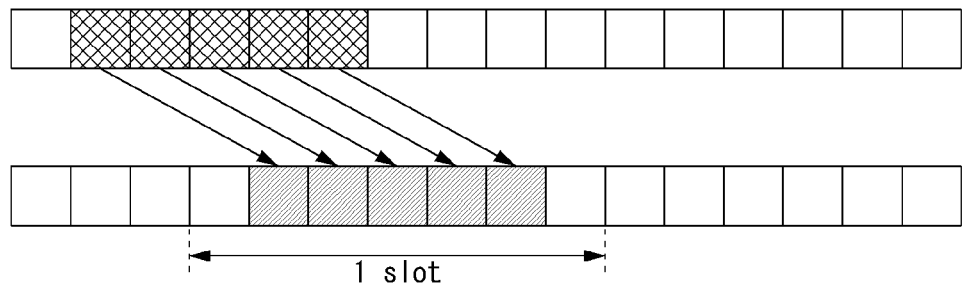
(b)

[Fig. 10]
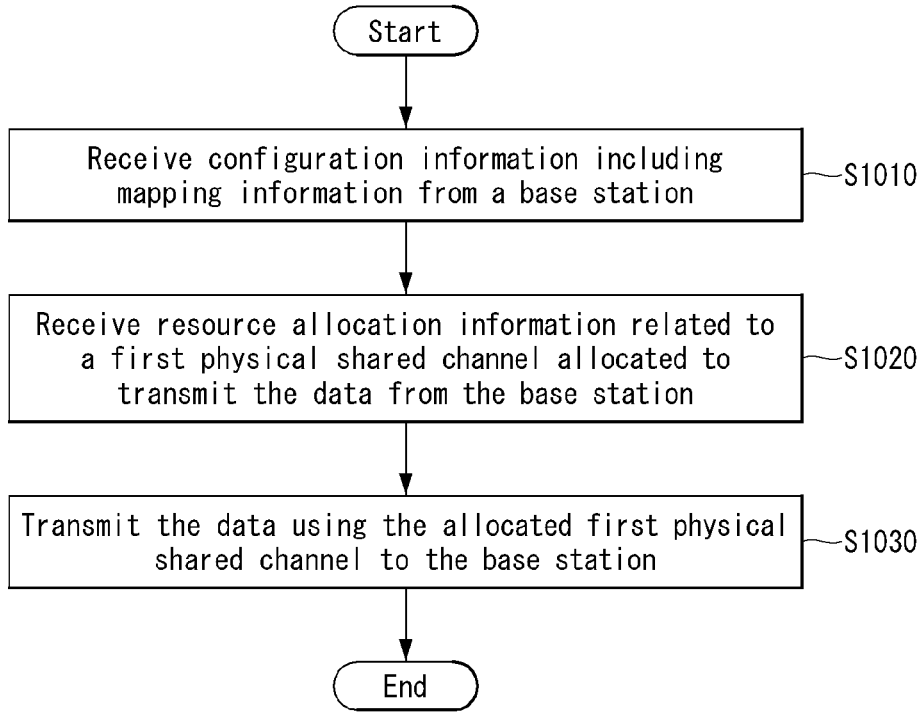
[Fig. 11]
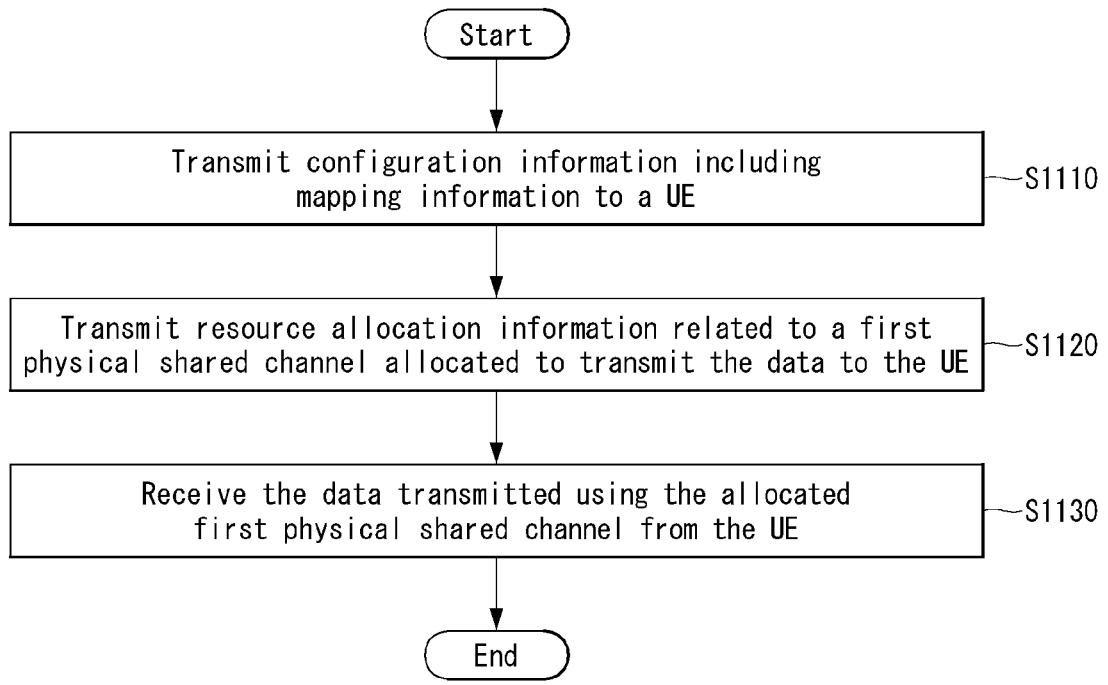

[Fig. 12]
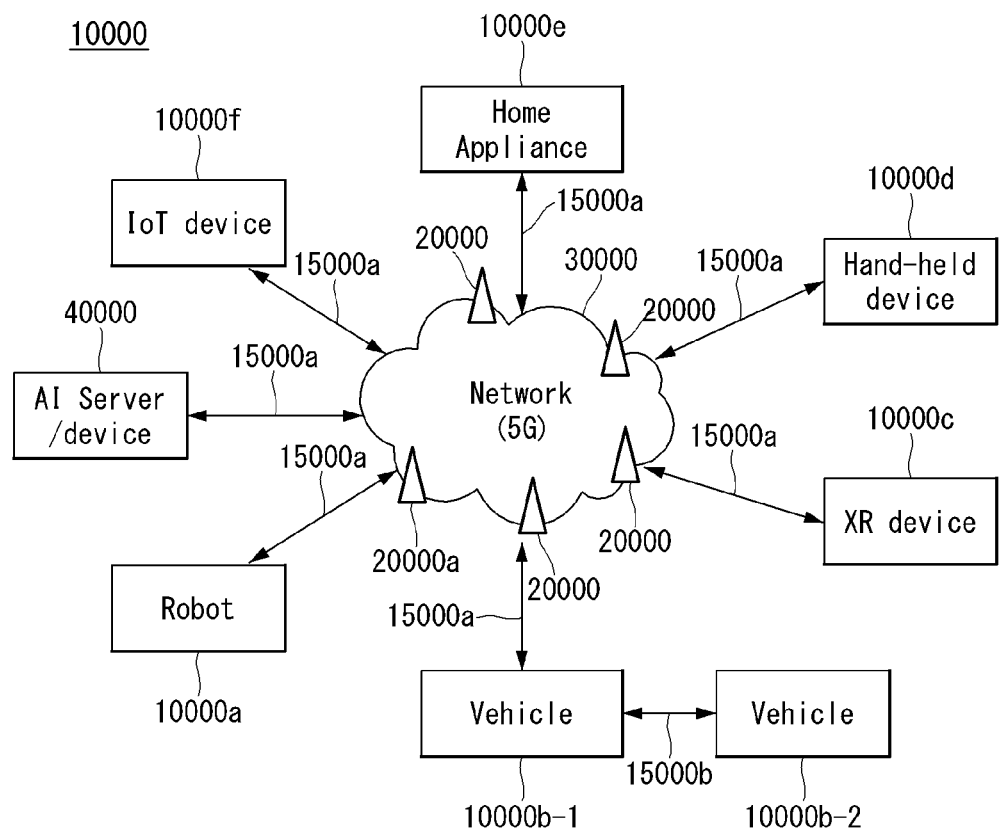
[Fig. 13]
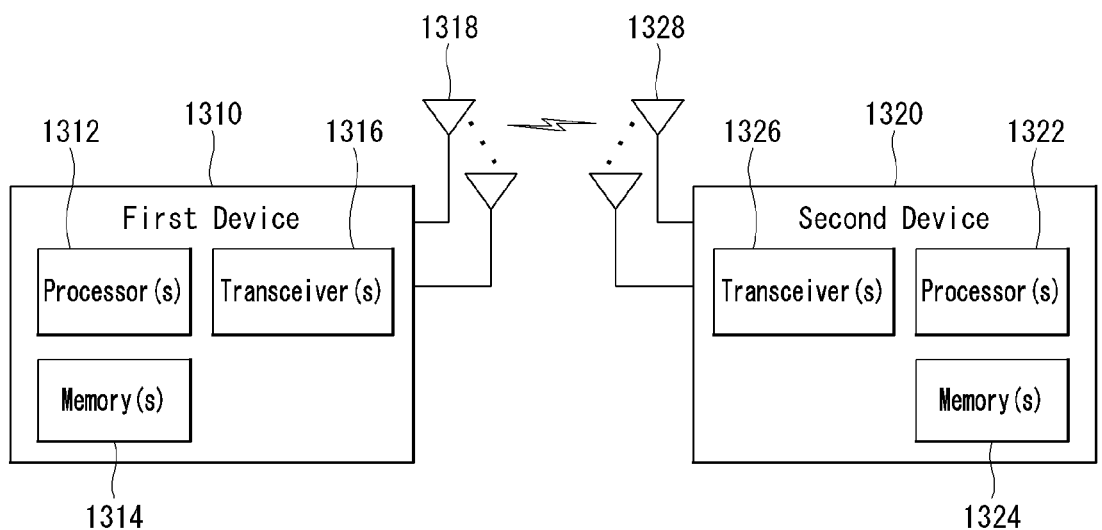

[Fig. 14]
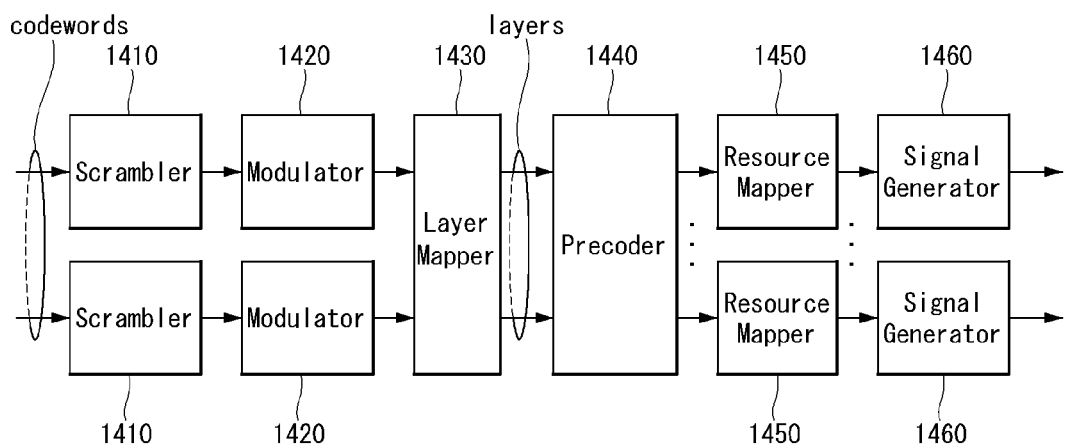
[Fig. 15]
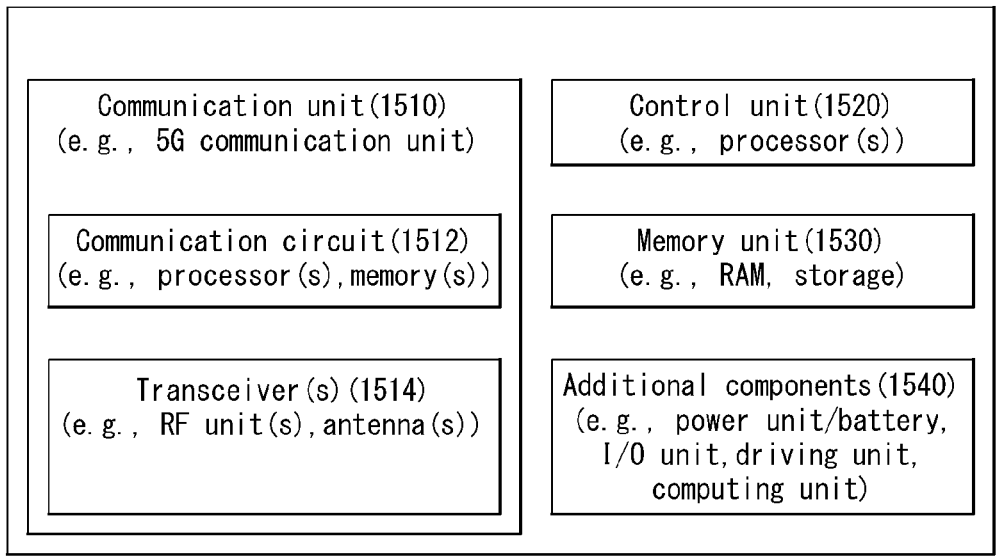

[Fig. 16]
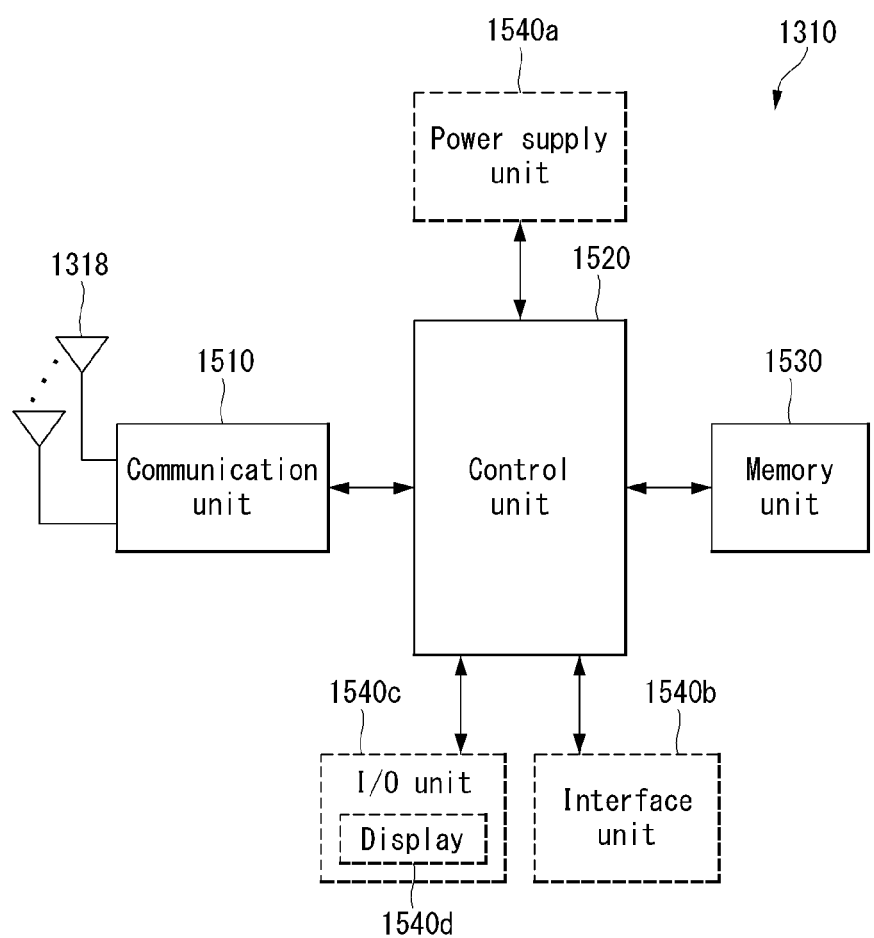

METHOD FOR TRANSMITTING DATA ON PHYSICAL SHARED CHANNEL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2019/014869, filed on Nov. 4, 2019, which claims the benefit of K.R Application No. 10-2018-0133945, filed on Nov. 2, 2018, and U.S. Provisional Application No. 62/825,944, filed on Mar. 29, 2019, the contents of which are all hereby incorporated by reference herein in their entirety.

TECHNICAL FIELD

The present disclosure relates to a wireless communication system and, more particularly, to a method of transmitting data on a physical shared channel and an apparatus supporting the same.

BACKGROUND ART

Mobile communication systems have been developed to provide voice services while ensuring the activity of a user. However, the mobile communication systems have been expanded to their regions up to data services as well as voice. Currently, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. For this, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of the present disclosure is to provide a method for transmitting data on a physical shared channel.

Furthermore, an object of the present disclosure is to provide a method for locating a Demodulation Reference Signal (DMRS) on a physical shared channel.

Furthermore, an object of the present disclosure is to provide a method for locating a DMRS on a physical shared channel on which data is repeatedly transmitted on a single slot.

Furthermore, an object of the present disclosure is to provide a method for locating a DMRS on a physical shared channel, in the case that the physical shared channel is inconsecutive in a time domain.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method for transmitting data on a physical shared channel in a wireless communication system.

Particularly, the method performed by a User Equipment includes receiving, from a base station, configuration information including mapping information; receiving, from the base station, resource allocation information related to a first physical shared channel allocated to transmit the data; and transmitting the data using the allocated first physical shared channel to the base station, wherein the data is transmitted repeatedly as much as a number of the first physical shared channel on a physical shared channel group including a predetermined number of the first physical shared channels, wherein a first dedicated demodulation-Reference Signal (DMRS) for the data is mapped to a symbol constructing the physical shared channel group according to the mapping information and transmitted to the base station, and wherein the mapping information is information for mapping a second DMRS for a second physical shared channel including symbols of a same number as a symbol number constructing the physical shared channel group.

Furthermore, according to the present disclosure, the data is transmitted on a slot.

Furthermore, according to the present disclosure, the first physical shared channel includes one or more consecutive symbols.

Furthermore, according to the present disclosure, the first DMRS is mapped only to a symbol constructing a specific physical shared channel among the first physical shared channels which are transmitted repeatedly in the physical shared channel group.

Furthermore, according to the present disclosure, when the physical shared channel group includes two first physical shared channels, and the mapping information is applicable only to the physical shared channel transmitted first among the first physical shared channels which are transmitted repeatedly in the physical shared channel group, wherein the first DMRS is mapped to a symbol constructing a symbol constructing the physical shared channel transmitted first, and wherein a position of the symbol to which the first DMRS is mapped and the corresponding position are mapped to a DMRS in the physical shared channel transmitted second among the first physical shared channels which are transmitted repeatedly in the physical shared channel group.

Furthermore, according to the present disclosure, the mapping information includes information for a position of a specific symbol to which the first DMRS is mapped.

Furthermore, according to the present disclosure, when the physical shared channel group is configured on a plurality of slots, wherein the mapping information includes information for a position of a specific slot to which the first DMRS is mapped.

Furthermore, according to the present disclosure, a User Equipment for transmitting data on a physical shared channel in a wireless communication system includes a transceiver for transmitting and receiving a radio signal; and a processor functionally connected to the transceiver, wherein the processor is configured to: receive, from a base station, configuration information including mapping information; receive, from the base station, resource allocation information related to a first physical shared channel allocated to transmit the data; and transmit the data using the allocated first physical shared channel, wherein the data is transmitted repeatedly as much as a number of the first physical shared channel on a physical shared channel group including a predetermined number of the first physical shared channels, wherein a first dedicated demodulation-Reference Signal (DMRS) for the data is mapped to a symbol constructing the physical shared channel group according to the mapping information and transmitted to the base station, and wherein the mapping information is information for mapping a second DMRS for a second physical shared channel including symbols of a same number as a symbol number constructing the physical shared channel group.

Furthermore, according to the present disclosure, the data is transmitted on a slot.

Furthermore, according to the present disclosure, the first physical shared channel includes one or more consecutive symbols.

Furthermore, according to the present disclosure, the first DMRS is mapped only to a symbol constructing a specific physical shared channel among the first physical shared channels which are transmitted repeatedly in the physical shared channel group.

Furthermore, according to the present disclosure, when the physical shared channel group includes two first physical shared channels, and the mapping information is applicable only to the physical shared channel transmitted first among the first physical shared channels which are transmitted repeatedly in the physical shared channel group, wherein the first DMRS is mapped to a symbol constructing a symbol constructing the physical shared channel transmitted first, and wherein a position of the symbol to which the first DMRS is mapped and the corresponding position are mapped to a DMRS in the physical shared channel transmitted second among the first physical shared channels which are transmitted repeatedly in the physical shared channel group.

Furthermore, according to the present disclosure, the mapping information includes information for a position of a specific symbol to which the first DMRS is mapped.

Furthermore, according to the present disclosure, when the physical shared channel group is configured on a plurality of slots, wherein the mapping information includes information for a position of a specific slot to which the first DMRS is mapped.

Furthermore, according to the present disclosure, a method for receiving data transmitted on a physical shared channel in a wireless communication system, the method performed by a base station includes transmitting, to a User Equipment, configuration information including mapping information; transmitting, to the User Equipment, resource allocation information related to a first physical shared channel allocated to transmit the data; and receiving, from the User Equipment, the data transmitted using the allocated first physical shared channel, wherein the data is transmitted repeatedly as much as a number of the first physical shared channel on a physical shared channel group including a predetermined number of the first physical shared channels, wherein a first dedicated demodulation-Reference Signal (DMRS) for the data is mapped to a symbol constructing the physical shared channel group according to the mapping information and transmitted to the base station, and wherein the mapping information is information for mapping a second DMRS for a second physical shared channel including symbols of a same number as a symbol number constructing the physical shared channel group.

Advantageous Effects

According to the present disclosure, there is an effect of locating a DMRS on a physical shared channel on which data is repeatedly transmitted on a single slot efficiently.

Furthermore, the present disclosure provides a method of locating a DMRS on a physical shared channel on which data is repeatedly transmitted on a single slot efficiently, and there is an effect of decoding data which is repeatedly transmitted on a single slot efficiently.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 is a diagram showing an AI device to which a method proposed in this specification may be applied.

FIG. 2 is a diagram showing an AI server to which a method proposed in this specification may be applied.

FIG. 3 is a diagram showing an AI system to which a method proposed in this specification may be applied.

FIG. 4 is a diagram showing an example of a general system configuration of NR to which a method proposed in this specification may be applied.

FIG. 5 shows a relation between an uplink frame and a downlink frame in a wireless communication system to which a method proposed in this specification may be applied.

FIG. 6 shows an example of a resource grid supplied in a wireless communication system to which a method proposed in this specification may be applied.

FIG. 7 shows examples of a resource grid for each antenna port and numerology to which a method proposed in this specification may be applied.

FIG. 8 is a diagram showing an example of a self-contained slot structure to which implementations of this disclosure may be applied.

FIG. 9 is a diagram illustrating an example of transmitting a PUSCH containing HARQ-ACK feedbacks within a slot proposed in the present disclosure.

FIG. 10 is a flowchart illustrating an example of a UE operation method performing a method for transmitting data on a physical shared channel proposed in the present disclosure.

FIG. 11 is a flowchart illustrating an example of a base station operation method performing a method for receiving data transmitted on a physical shared channel proposed in the present disclosure.

FIG. 12 is an example of a wireless communication system to which the methods proposed in the present disclosure may be applied.

FIG. 13 is an example of a wireless device to which the methods proposed in the present disclosure may be applied.

FIG. 14 is an example of a signal processing circuit to which the methods proposed in the present disclosure may be applied.

FIG. 15 is another example of a wireless device to which the methods proposed in the present disclosure may be applied.

FIG. 16 is an example of a portable device to which the methods proposed in the present disclosure may be applied.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

In the present specification, 'A and/or B' may be interpreted in the same sense as 'including at least one of A or B'.

Hereinafter, examples of 5G use scenarios to which a method proposed in this specification may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-driving (autonomous-driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in this specification may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method proposed in this specification may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method proposed in this specification may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+self-driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR radio access or new radio.

General System

FIG. 4 illustrates an example of an overall structure of a NR system to which a method proposed by the present specification is applicable.

Referring to FIG. 4, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max}N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 5 illustrates a relation between an uplink frame and a downlink frame in a wireless communication system to which a method proposed by the present specification is applicable.

As illustrated in FIG. 5, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots, \mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 3 shows the number of OFDM symbols per slot for a normal CP in the numerology μ, and Table 4 shows the number of OFDM symbols per slot for an extended CP in the numerology μ.

antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

FIG. 6 illustrates an example of a resource grid supported in a wireless communication system to which a method proposed by the present specification is applicable.

Referring to FIG. 6, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max, \mu}$. The above $N_{RB}^{max, \mu}$ indicates the maximum transmission bandwidth, and it may change not just between numerologies, but between UL and DL.

In this case, as illustrated in FIG. 7, one resource grid may be configured per the numerology μ and an antenna port p.

FIG. 7 illustrates examples of a resource grid per antenna port and numerology to which a method proposed by the present specification is applicable.

TABLE 3

| | Slot configuration | | | | | |
|---|---|---|---|---|---|---|
| | 0 | | | 1 | | |
| μ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 4

| | Slot configuration | | | | | |
|---|---|---|---|---|---|---|
| | 0 | | | 1 | | |
| μ | $N_{symb}^\mu$ | $N_{frame}^{slots, \mu}$ | $N_{subframe}^{slots, \mu}$ | $N_{symb}^\mu$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one Each element of the resource grid for the numerology μ and the antenna port p is indicated as a resource element, and may be uniquely identified by an index pair (k,l). Herein, $k=0, \ldots, N_{RB}^\mu N_{sc}^{RB}-1$ is an index in the frequency domain, and $l=0, \ldots, 2^\mu N_{symb}^{(\mu)}-1$ indicates a location of a symbol in a subframe. To indicate a resource element in a slot, the index pair (k,l) is used, where $l=0, \ldots, N_{symb}^\mu-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Slot Structure

To minimize latency of data transmission in a TDD system, 5G new RAT (NR) has considered a self-contained slot structure illustrated in FIG. 8.

That is, FIG. 8 illustrates an example of a self-contained slot structure to which a method proposed by the present specification is applicable.

In FIG. 8, a hatched portion 810 denotes a downlink control region, and a black portion 820 denotes an uplink control region.

A non-marked portion 830 may be used for downlink data transmission or uplink data transmission.

Such a structure may be characterized in that DL transmission and UL transmission are sequentially performed in one slot, DL data is sent in one slot, and UL Ack/Nack is also transmitted and received in one slot.

Such a slot may be defined as a 'self-contained slot'.

That is, through the slot structure, the base station reduces the time it takes to retransmit data to the UE when a data transmission error occurs, and thus can minimize latency of final data delivery.

In the self-contained slot structure, the base station and the UE require a time gap in a process for switching from a transmission mode to a reception mode or a process for switching from the reception mode to the transmission mode.

To this end, in the corresponding slot structure, some OFDM symbols at time of switching from DL to UL are configured as a guard period (GP).

Analog Beamforming

As a wavelength becomes short in the Millimeter Wave (mmW) band, it is available to install a plurality of antenna elements in the same area. That is, a total of 100 antenna elements may be installed at (i.e., wavelength) intervals of 0.5 lamda in a 30 GHz band with a wavelength of 1 cm in a two-dimensional array on a 5 by 5 cm panel. Therefore, it is considered to increase coverage or throughput by increasing a beamforming (BF) gain by use of a plurality of antenna elements in mmW.

In this case, independent beamforming per frequency resource is available in the case that a transceiver unit (TXRU) is provided such that each antenna element enables to control a transmission power and a phase. However, installation of TXRUs for all of 100 antenna elements is not effective in terms of cost. Therefore, it has been considered a method of mapping a plurality of antenna elements to a single TXUR and adjusting a direction of beam using an analog phase shifter. Such an analog beamforming method has a disadvantage that only one beam direction can be produced in a total band and a frequency selective BF is unavailable.

Hybrid BF stands between digital BF and analog BF, in which B TXRUs fewer than Q antenna elements are used. In this case, the directions of beams transmittable at the same time is limited to or below B although the number of beam directions is different according to connections between B TXRUs and Q antenna elements.

Bandwidth Part (BWP)

In the NR system, a maximum of 400 MHz can be supported per component carrier (CC). If a UE operating in such a wideband CC operates with RF for all CCs turn on all the time, UE battery consumption may increase. Alternatively, considering use cases operating in one wideband CC (e.g., eMBB, URLLC, mMTC, V2X, etc.), different numerologies (e.g., sub-carrier spacings) can be supported for different frequency bands in the CC. Alternatively, UEs may have different capabilities for a maximum bandwidth. In consideration of this, a base station may instruct a UE to operate only in a part of bandwidth, not in the entire bandwidth of a wideband CC, and the part of the bandwidth is defined as a bandwidth part (BWP) for the convenience of description. A BWP may include resource blocks (RBs) consecutive on the frequency axis and may correspond to one numerology (e.g., a subcarrier spacing, a CP length, a slot/mini-slot duration).

Meanwhile, the base station may configure a plurality of BWPs for even one CC configured for a UE. For example, a BWP occupying a relatively small frequency domain may be set in a PDCCH monitoring slot and a PDSCH indicated by a PDCCH may be scheduled on a BWP wider than the BWP. Alternatively, when UEs converge on a specific BWP, some UEs may be set to other BWPs for load balancing. Alternatively, BWPs on both sides of a bandwidth other than some spectra at the center of the bandwidth may be configured in the same slot in consideration of frequency domain inter-cell interference cancellation between neighboring cells. That is, the base station may configure at least one DL/UL BWP fora UE associated with wideband CC and activate at least one of DL/UL BWPs configured at a specific time (through L1 signaling or MAC CE or RRC signaling), and switching to other configured DUUL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DUUL BWP assumed by the UE is defined as an initial active DL/UL BWP.

UCI enhancement

FIG. 9(a) is a diagram illustrating Back-to-back scheduling and a single PUCCH containing HARQ-ACK feedbacks within a slot.

FIG. 9(b) is a diagram illustrating Back-to-back scheduling and the corresponding multiple HARQ-ACK feedbacks within a slot.

When it is considered a stringent latency like in the URLLC service and the reliability requirement, in the case that a rule is defined such that HARQ-ACK feedback corresponding to a plurality of PDSCHs configures HARQ-ACK codebook of a PUCCH scheduled to be transmitted to a single specific slot according to the current NR rel-15 standard (FIG. 9(a)), HARQ-ACK payload size becomes relatively greater, and owing to this, there is a problem that a degradation of PUCCH transmission performance may be caused. In addition, in order to support a latency-critical service, a plurality of PDSCHs having short duration needs to be repeatedly transmitted even in a slot. In the case that only one HARQ-ACK PUCCH transmission is allowed in a slot although a plurality of PDSCHs is transmitted by scheduling of a base station, there is a problem that the HARQ-ACK feedback transmission for the back-to-back scheduling is relatively delayed. Accordingly, for more flexible and efficient resource application and service support, and more rapid and robust UL channel transmission, a plurality of PUCCHs (or PDSCHs) including a plurality of HARQ-ACKs needs to be available in a slot (FIG. 9(b)).

Scheduling/HARQ Processing Timeline

Generally, the PDSCH/PUSCH by PDCCH received first are received/transmitted prior to the PDSCH/PUSCH by PDCCH received later. Accordingly, for the NR Rel-15 UE of the current standard, out-of-order PDSCH/PUSCH scheduling is not allowed, and accordingly, it is ruled that the UE does not expect such a situation. In addition, similarly, out-of-order HARQ transmission/feedback is not allowed, and accordingly, it is ruled that the UE does not expect such a situation.

For a UE having traffic of various requirements (e.g., eMBB and URLLC), in order to satisfy more stringent latency requirement for a specific service (e.g., URLLC), it may be required to allow an operation that a packet scheduled later is processed prior to a packet scheduled first. In addition, it may be required to allow an operation that HARQ-ACK for a packet scheduled later is transmitted prior to HARQ-ACK for a packet scheduled first.

In this case, out-of-order scheduling means that for any two HARQ process IDs A and B for a given cell, if the scheduling DCI scrambled by C-RNTI for unicast PUSCH transmission A comes before (in time) the scheduling DCI scrambled by C-RNTI for unicast PUSCH transmission B, PDSCH/PUSCH for B is before the PDSCH/PUSCH for A.

In this case, out-of-order HARQ-ACK means that for any two HARQ process IDs A and B for a given cell, the scheduled unicast PDSCH transmission for A comes before the scheduled unicast PDSCH transmission for B, while the HARQ-ACK for B is expected to be transmitted earlier than the HARQ-ACK for A.

(Out-of-order HARQ-ACK means that for any two HARQ process IDs A and B for a given cell, the scheduled unicast PDSCH transmission for A comes before the scheduled unicast PDSCH transmission for B, while the HARQ-ACK for B is expected to be transmitted earlier than the HARQ-ACK for A.)

UL inter-UE Tx Prioritization/Multiplexing

For UL, in order to satisfy more stringent latency requirement, a transmission for a specific type of traffic (e.g., URLLC) needs to be multiplexed with another transmission scheduled first (e.g., eMBB). Accordingly, information indicating that it is preempted for a specific resource is provided to a UE scheduled first and a URLLC UE may use the corresponding resource for a UL transmission. Alternatively, a resource is scheduled to different UEs in overlap manner, but a power of the UE that transmits a traffic corresponding to more stringent requirement is boosted, and the transmission reliability for the traffic is guaranteed.

PDCCH Enhancement

In relation to PDCCH enhancement, it has been discussed a compact DCI, PDCCH repetition and increased PDCCH monitoring capacity.

In the existing system, since a PDCCH is designed to have much higher reliability than PUSCH/PDSCH, an influence of PDCCH may be very small or neglected in PUSCH/PDSCH reliability.

However, when the stringent latency and reliability requirement are considered like in URLLC service, reliability of PUSCH/PDSCH transmission that may be generated from a single PDCCH transmission is required to be higher than the existing PDCCH reliability. In this case, it is required to increase PDCCH reliability used for URLLC sufficiently such that the PDCCH reliability is not bottlenecked.

As a solution for this, it may be allowed to use a greater resource or transmit smaller size of information. As an example of former case, it may be allowed an operation to apply higher CCE aggregation level as previously for a DCI transmission or to perform multiple PDCCH transmissions for a single PUSCH/PDSCH transmission. As an example of latter case, it may be introduced a DCI format of smaller bit size than the bit size of DCI previously used.

Meanwhile, in order to satisfy stringent latency requirement or for rapid resource allocation, a base station may set a plurality of PDCCH monitoring occasions (MOs) for a UE. According to the current NR rel-15 standard, since a UE may perform only a predetermined number of channel estimations (CEs) and blind decoding (BD) in a single slot, even in the case that a base station set a plurality of MOs, a UE may be unavailable to use it and receive a PDCCH. Accordingly, for more flexible and efficient PDCCH reception and rapid reception/transmission of PDSCH/PUSCH, it is required a method of alleviating such a BD/CE restriction or performing BD/CE more efficiently within a limited number.

PUSCH Enhancement

In relation to PUSCH enhancement (improvement), it has been discussed mini-slot level hoping and retransmission/repetition improvement.

When a UE transmit a single PUSCH transmission repeatedly for reliability or coverage, in the case that the UE transmits the transmission using an identical resource allocation in consecutive slots according to the NR rel-15 standard, it is required to transmit a PUSCH transmission using multiple consecutive slots. However, there is a problem that this makes flexible resource allocation difficult.

In addition, when a PDCCH reception and a PUSCH allocation are performed in a single slot for securing latency, only a few symbols is usable in rear portion of the slot. Accordingly, there is a problem that repeated transmission performed for satisfying reliability may cause big latency. Therefore, for more flexible resource application and service support, and more rapid and robust UL channel transmission, a UE needs to support multiple PUSCH transmissions in a slot by transmitting a PUSCH repeatedly in an interval smaller than a slot or transmit a PUSCH regardless of a slot boundary. Furthermore, in the case that a plurality of PUSCHs is transmitted in a slot, in order to secure reliability by acquiring frequency diversity, it is required a frequency hopping method of a plurality of PUSCHs.

Enhanced UL Configured Grant (Grant Free) Transmissions

For enhancement (improvement) UL configured grant (grant (approval) free) transmissions, it is required an enhancement (improvement) configured grant operation like an implicit HARQ-ACK which secures K times repetitions and mini-slot repetitions.

In the case that a PUSCH transmission according to a grant (approval) configured according to the current NR rel-15 standard, a resource allocation for a single Transport Block (TB) needs to be determined within a period of a configured grant always. In addition, in the case that a repetition transmission is used for securing enough reliability, it is ruled that each repetition transmission is transmitted using an identical resource allocation in consecutive slots. Particularly, in a plurality of PUSCH resources within the period configured as such, a UE may start a PUSCH transmission only in a position predetermined according to redundancy version (RV) sequence. Accordingly, in the case that a long time or a plurality of PUSCH resources is used for securing reliability, there is a problem that it is hard to set a short period, and it is hard to utilize repetition transmission of enough number in the case that TB transmission is started in a middle of a plurality of PUSCH resources which is set within a period.

Since a transmission period of configured grant (approval) is closely related to latency of PUSCH, it is required to allow an operation of using a configured grant (approval) of short period regardless of a transmission length of PUSCH. Alternatively, even in the case that a TB transmission is started in a middle of a plurality of PUSCH resources, it is required to allow an operation of performing repetition transmission of enough number. Furthermore, in order to perform the operations more efficiently, it is required an operation of transmitting a PUSCH repeatedly in an interval which is shorter than a slot.

Furthermore, in the case that a PUSCH transmission is performed by a grant (approval) configured according to the current NR rel-15 standard, a UE may know successful PUSCH transmission only through a UL grant (approval) for a retransmission transmitted by a base station. In other words, in the case that there is no response from the base station, the UE assumes that it is transmission success. In the case that a transmission of UE is not acknowledged by a base station owing to an abrupt channel change, there is a possibility that the UE assumes wrongly (i.e., transmission is successfully performed) for a PUSCH transmission. Therefore, it is required to allow an additional feedback signaling of a base station so that a UE identifies whether a PUSCH transmission is succeeded.

UL Repetition Transmission Method Through Semi-Persistent Scheduling

In the case of a transmission for a traffic of a service like URLLC or that requires more stringent BLER/latency/reliability requirement, a time domain repetition transmission may be required. That is, for the purpose of high reliability and/or short latency of a specific transport block (TB)/code block (CB) (group), a repetition transmission of TTI/slot/symbol unit may be applied to a corresponding channel. The repetition transmission may be applied to a transmission of semi-persistent scheduling (SPS) or a PDCCH-less channel which is similar to the SPS and may also applied in a form of grant-free UL channel repetition transmission that transmits a UL channel to a configured channel through a higher layer signal in advance considered in NR.

In the case that a repetition transmission is configured/indicated for a UL transmission for a specific TB/CB (group), an increase/decrease value predefined for open-loop power control (e.g., P_O alpha) and/or TPC accumulation may be configured differently for each PUSCH/PUCCH repetition number. That is, a UE may determine a final transmission power by applying open-loop power control parameter of different value according to configured/indicated repetition transmission number. As another example, a UE may interpret a specific TPC command as different value according to configured/indicated repetition transmission number.

In the present disclosure, when a UE is allocated with a resource for performing UL or DL transmission from a base station for Ultra reliability and low latency communication (URLLC) and uses it repeatedly, it is described a method for using the allocated resource more efficiently.

The next generation system seeks to use a wide frequency band and support various services or requirements. For example, according to 3GPP NR requirement, one of the representative scenarios Ultra Reliable and Low Latency Communications (URLLC) requires a user plane delay time of 0.5 ms and that data of X byte needs to be transmitted within 10-5 error rate within 1 ms. That is, it has low latency and high reliability requirement. In addition, generally, while enhanced Mobile BroadBand (eMBB) has high traffic capacity, traffic of URLLC has different property from the URLLC that a file size is within dozens to hundreds of bytes and sporadically occurred. Accordingly, eMBB requires a transmission of which transmission rate is maximized and minimizing overhead of control information, and URLLC requires a short scheduling time unit and reliable transmission method.

Depending on an application field or a type of traffic, various reference time units may be assumed/used to transmit/receive a physical channel. The reference time may be a basic unit for scheduling a specific physical channel, and the reference time unit may be changed depending on the number of symbol constructing the scheduling unit and/or subcarrier spacing, and the like. In the embodiment, method, and the like described in the present disclosure, it is described based on a slot or a mini-slot as the reference time unit for the convenience of description. A slot may be a scheduling basic unit used for a general data traffic (e.g., eMBB). A mini-slot may have smaller time interval than that of a slot in the time domain and may be a scheduling basic unit used for more special purpose of traffic or communication scheme (e.g., URLLC, unlicensed band, millimeter wave, etc.). However, this is just an embodiment, and it is apparent these may be extendible to the case that eMBB transmits/receives a physical channel based on a mini-slot or URLLC or other communication scheme transmits/receives a physical channel based on a slot.

The present disclosure describes, in the case that a base station allocates a Physical Downlink Shared Channel (PDSCH) or a Physical Uplink Shared Channel (PUSCH) to a UE and represents or configures the related repetition transmission operation through L1 signaling or higher layer parameter, a method for the UE or the base station to utilize the repeated PDSCH or PUSCH more efficiently.

Particularly, it is described a method for determining a Demodulation Reference Signal (DMRS) symbol and individual power control method for each of the repeated PDSCH or PUSCH. Hereinafter, for the convenience of description, only a PUSCH is described, but the description is extendible to the case of a transmission using a PDSCH or other physical transport channel from the concept of the present disclosure.

Hereinafter, each of the embodiments or each of the methods described herein may be performed as a whole or a part, and the method proposed in the present disclosure may be implemented through the combination of the whole or a part of the method.

DMRS Sharing Among Repeated Resource Allocation

As described above, in the conventional system, it is available to use the same resource allocation repeatedly to secure higher transmission reliability. In addition, in order to reduce latency occurred in such a repetition transmission, it has been considered to transmit several PUSCHs in a single slot using a symbol unit or consecutive symbols, not a slot unit.

A plurality of methods may be present to determine a DMRS symbol for a single PUSCH. In the conventional system, in order to determine a position of DMRS symbol for a PUSCH or a PDSCH, it may be used mapping type A, in which a position of DMRS symbol is determine based on a slot boundary or mapping type B, in which a position of DMRS symbol is determine based on a starting symbol of an allocated PUSCH. Such mapping types A and B may be determined through L1 signaling and/or a higher layer configuration.

In the case that a plurality of PUSCHs is transmitted to a base station using consecutive symbols, it may be considered that a DMRS is transmitted with being mapped (located) to each PUSCH. However, in the case that a UE performs PUSCH repetition transmission using consecutive symbols, although a part of PUSCH is not transmitted with a DMRS, a base station may perform a channel estimation by using a DMRS transmitted through different PUSCH and perform a PUSCH decoding.

This may alleviate DMRS overhead and secure low coding rate and may be efficient to secure reliability of transmission. Here, in the case that a UE transmits a plurality of PUSCHs repeatedly, particularly, in the case that a plurality of PUSCHs is forwarded to consecutive symbols in a single slot, the following methods may be considered.

(Method 1)

In the case that a UE forwards a plurality of PUSCHs using consecutive symbols or transmitting a plurality of PUSCHs throughout several slots, it may be regarded that a DMRS is processed in a slot.

Considering PUSCH transmissions in each slot, the UE may use a DMRS symbols position used by a single long PUSCH resource allocation having a time resource domain allocation which is equivalent to a PUSCH bundle repeated in a slot in order to determine a position of DMRS in a PUSCH for transmitting the DMRS for the corresponding PUSCH symbol bundle. A base station may assume a DMRS symbol of PUSCH transmitted by the UE in the same method and perform a channel estimation through this.

In other words, the UE may receive information for a DMRS position according to a PUSCH transmission that uses each symbol number (size) from the base station and apply the DMRS position information for a symbol number (size) which is identical to a PUSCH bundle repeated in a slot for a repeated PUSCH bundle transmission.

For example, assuming that a PUSCH is repeated K times in the corresponding slot, and a starting symbol is S and a length is L of the PUSCH which is initially transmitted in the slot, the UE may apply an absolute or relative position [p0, p1, . . . , pn] of the DMRS symbol used by the PUSCH of which starting symbol is S and the length is L to repeated PUSCHs, and the base station may assume a DMRS symbol of the PUSCH transmitted by the UE in the same method, and through this, perform a channel estimation.

Particularly, in the case that a PUSCH having 2 symbol length is transmitted repeatedly for 4 times in a slot, the UE may assume a PUSCH having 8 symbol length (2*4) and apply the position of DMRS symbol used by the PUSCH 8 symbol length to the slot.

Method 1 described above enables to determine a DMRS symbol position of other PUSCH to which the corresponding method is not applicable by using a DMRS symbol position determination method which is applicable to a single long PUSCH resource allocation having an equivalent time resource domain allocation.

As another example, DMRS mapping type A is applied to the PUSCH transmitted from a starting symbol of a slot, and in the case of transmitting such a PUSCH repeatedly, since a starting symbol of PUSCH repeated after the first PUSCH is not the first symbol (starting symbol) of the slot, there is a difficulty in applying the corresponding DMRS mapping type. In this case, by using the proposed method 1, the UE may perform a PUSCH repetition transmission by using a plurality of PUSCH bundles in a DMRS symbol position used when the DMRS mapping type is applied to the PUSCH having a length which is equivalent to a plurality of PUSCH bundles in a slot. The base station may perform a channel estimation by assuming a DMRS symbol position using the same method. This may make it easy multiplexing with the existing long duration PUSCH, and there is an effect of simplifying an operation of UE.

As another example, DMRSs mapped to the first PUSCH and the PUSCH transmitted after the first PUSCH transmission may be differently determined. It may be assumed that a DMRS may mapped to the first PUSCH even in the case that the first PUSCH is mapped to any position, and in this case, a DMRS pattern may be applied, which is configured in a configuration related to the corresponding PUSCH transmission.

It may be considered to apply the method 1 to the PUSCH transmitted after the first PUSCH by considering the previous PUSCH transmission. In this case, it may be assumed that the DMRS is transmitted only in an area which is overlapped with its own PUSCH.

For example, a UE may be provided with configuration information indicating that a DMRS is positioned in the first, fourth, seventh and tenth position of symbol in a slot from a base station, and in this case, the UE may transmit a PUSCH having 4 symbol length three times repeatedly.

In other words, it may be assumed that a UE may transmit a PUSCH having 12 (4*3) symbol length, and in this case, a DMRS may be positioned in the symbols of PUSCHs transmitted after the first PUSCH, that is, the seventh and tenth symbols which are overlapped with the configuration information provided by the base station among the symbols from the fifth symbol to the twelfth symbol, and this may be information different from the information for determining a DMRS position located in the first PUSCH.

In addition, a base station may configure a separate DMRS configuration for applying method 1 to a UE, and the UE may perform method 1 by applying the DMRS configuration. The DMRS configuration may include RRC parameters included in DMRS-UplinkConfig which is the exiting information element such as 'dmrs-AdditionalPosition', 'dmrs-TypeA-Position'.

Through this, there is an effect that higher (more accurate) DMRS channel estimation than a long period PUSCH may be guaranteed, or lower coding rate may be used.

(Method 2)

In the case that a UE uses a position determination method of a specific DMRS symbol, particularly, determines a position of DMRS symbol based on a starting symbol of a slot in the corresponding method, and in the case that the position determination method of a specific DMRS symbol is applicable only to some PUSCH or PUSCH group among the PUSCHs repeated in the slot, for example, the first PUSCH, the following method may be considered.

(Method 2-1) A UE and a base station may determine a position of DMRS symbol only for a PUSCH or PUSCH group A to which the position determination method of a specific DMRS symbol is applicable through the method and determine a position of DMRS symbol using different method to a PUSCH or PUSCH group B to which the position determination is not applicable, for example, the later PUSCH after repetition. As the different method, the position determination method of DMRS symbol is applied to the PUSCH to which the position determination is not applicable based on a start of the scheduled PUSCH resources and a DMRS pattern (symbol position) may be determined.

The methods of determining a position of DMRS symbol may be informed to a UE by a base station.

Through this, there is an effect that a repetition transmission in a slot is usable regardless of the position determination method of DMRS symbol.

(Method 2-2) A UE and a base station may determine a position of DMRS symbol only for a PUSCH or PUSCH group A to which the position determination method of a specific DMRS symbol is applicable and use a relative position of the DMRS symbol determined in PUSCH A to a PUSCH or PUSCH group B to which the position determination is not applicable, for example, the later PUSCH after repetition.

For example, a position of DMRS symbol may be determined based on a start of the slot symbol in the a first PUSCH. In the case that the DMRS symbol position determined as above is the first and third symbols allocated with PUSCH resources, a DMRS may be positioned on each of the first and third symbols of PUSCHs repeated after the first PUSCH symbol.

That is, the UE may transmit a DMRS in each of the first and third symbols in the PUSCH allocation and perform DMRS transmission in each of the first and third symbols of the PUSCH repeated later, and the base station may perform a channel estimation by assuming it.

Through this, there is an effect that a repetition transmission in a slot is usable regardless of the position determination method of DMRS symbol.

Even in the case that in the resource allocation of PUSCH repeatedly transmitted described above, although consecutive symbols are used, there is a case that some symbols is unable to be used by an assumption for a slot format of the UE or signaling of the associated base station. In this case, in the case that a part of the consecutive symbols is unavailable to be used for UL transmission, the following method may be considered.

(Method 3)

In the case that a part of PUSCH transmissions is impossible by a slot format configured through a base station, and particularly, in the case that a PUSCH is transmitted using inconsecutive symbols on a single slot owing to such a slot format configuration, PUSCHs transmitted using the consecutive symbols are bundled as one bundle, and method 1 described above may be applied to each of the bundles.

For example, a slot format may be configured through TDD-UL-DL configuration, and each of the symbols of the configured slot format may be a symbol having one of the types of a DL symbol, a UL symbol and a flexible symbol. Owing to this, that is, owing to the case that UL and DL symbols are configured together in a single slot, there may be a symbol which is unavailable to be used for PUSCH transmission.

Particularly, a PUSCH having 2-symbol length (size) may be transmitted five times repeatedly on a slot, depending on a slot format, a first symbol to a fourth symbol and a seventh symbol to a twelfth symbol may be configured as symbols which may be used for PUSCH transmission, and a fifth symbol and a sixth symbol may be configured as a symbol which is unavailable to be used for PUSCH transmission. In this case, the PUSCH using the first and the second symbols and the PUSCH using the third and fourth symbols may be regarded as a bundle (i.e., PUSCH having 4-symbol length (size)), and a DMRS may be positioned thereon. And each of the PUSCHs using the seventh and eighth symbols, the ninth and tenth symbols and the eleventh and twelfth symbols is regarded as a bundle (i.e., PUSCH having 6-symbol length (size)), and a DMRS may be positioned thereon.

Meanwhile, method 1 described above is not applied, but a DMRS may be transmitted in each of the PUSCHs.

Here, in the case that it is hard to use a method of determining a DMRS symbol which is configured for a PUSCH bundle or each of PUSCHs in advance, method 2 described above may be additionally applied. In other words, when consecutive symbols transmittable to a PUSCH are divided into a plurality of PUSCH bundles by a slot format configuration, a UE may determine a position of DMRS symbol using method 1 described above for each of the PUSCH bundles, and for the PUSCH bundle to which method 1 described above is hard to be applied, a position of DMRS symbol may be determined through method 2 described above.

In this case, in order to avoid ambiguity that may be occurred between a UE and a base station, method 3 may be applied to the slot format which is determined by using semi-static information only. In Method 3 described above, the PUSCH repetition transmission is performed through inconsecutive symbols, and there is an effect that a DMRS phase discontinuity that may occur in the case of applying method 1 described above may be prevented.

(Method 4)

Methods 1 to 3 described above relate to methods, that can be used for a channel estimation in the case that a PUSCH is repeatedly transmitted, each PUSCH shares the DMRS symbols repeatedly transmitted.

According to method 4, in the case that an identical or different Transport Block (TB) is transmitted using consecutive symbols in a slot to a plurality of PUSCHs allocated by a PUSCH resource allocation given to a UE through different path, particularly, allocated through one or more configured grant and/or dynamic grant, the UE may perform a PUSCH transmission by determining a position of DMRS symbol to a plurality of PUSCHs through the whole or a partial combination of method 1 to method 3 described above. In this case, a base station may perform a channel estimation for a PUSCH by assuming a position of DMRS symbol using the same method.

(Method 5)

In the case that a UE transmits a plurality of PUSCHs to consecutive symbols in a slot or even in the case that a UE transmit a plurality of PUSCHs throughout several slots, according to this method, it is regarded that each DMRS is processed in the slot.

Considering such PUSCH transmissions for each of the slots, a base station may select a PUSCH for which the UE transmits a DMRS by designating a PUSCH repetition that the UE transmits/carries the DMRS or using a predetermined method.

For example, the base station may configure for the UE such that a DMRS may be transmitted (carried) only in the first PUSCH and the last PUSCH.

As another example, a base station may configure a DMRS transmission pattern to a UE. Particularly, for example, a base station configures a DMRS pattern indicating a repetition order such as [n1, n2, n3, n5] to a UE, the base station may transmit a DMRS only in the first, second, third and fifth PUSCH repetition transmission. Even in the case that come PUSCHs become unusable by a slot of the format determined according to a slot format configuration, the base station may configure (instruct) an explicit DMRS pattern and control the DMRS transmission of the UE.

Owing to this, a UE may transmit a DMRS according to a predetermined method, instruction or configuration of a base station, and accordingly, UE complexity may be reduced.

As another methods, it may be assumed that a PUSCH to which Redundancy Version (RV)#0 is mapped carries a DMRS always. In this case, for other PUSCH than the PUSCH to which RV #0 is mapped, a DMRS may not be included and omitted according to DMRS sharing option. In this case, it may be determined/configured whether a DMRS is omitted by a network. In the case that {0, 0, 0, 0} RV is used for a PUSCH that a UE is intended to transmit, it may be assumed that a DMRS is positioned only in the first PUSCH, or methods 1 to 4 described above may be used.

Alternatively, it may be assumed that a DMRS is mapped only to the first PUSCH and the PUSCH to which RV #0 is mapped. In this case, a DMRS pattern may follow each PUSCH mapping scheme.

Alternatively, it may be assumed that a DMRS is mapped only to the PUSCH carrying RV #0, #3, or additionally, a DMRS of the first PUSCH may be assumed.

Alternatively, a DMRS sharing pattern may be provided to a UE by a base station, and the DMRS sharing pattern may be applied according to an absolute transmission occasion or determined according to a pattern which is actually transmitted. At this time, in the case that a DMRS pattern configured by a network and a DMRS pattern actually transmitted by the UE are different, since there is DMRS ambiguity, the DMRS sharing pattern may be applied according to an absolute transmission occasion, and in the case that the DMRS sharing pattern is a pattern which is unavailable to transmit sufficient DMRSs, the UE may disable the DMRS sharing.

An example that the DMRS sharing is disabled may include a case that a PUSCH intended to transmit a DMRS is canceled through a Slot Format Indicator (SFI) and/or Downlink Control Information (DCI) or becomes a resource which is unavailable to be used for DMRS transmission, and the case occurs minimum m (e.g., 1) times or more during the PUSCH repetition transmission.

In addition, in the case that the PUSCH to transmit a DMRS for reducing or removing ambiguity between a UE and a network is mapped to a semi-static UL resource and/or flexible resource, the PUSCH is regarded as valid. Meanwhile, when invalid case occurs m (e.g., 1) times or more, the DMRS sharing pattern may be disabled. In this case, a flexible resource may be counted only in the case that dynamic SFI is not configured. At this time, this may be regarded as invalid case even in the case that a PUSCH transmission is configured by the dynamic configuration.

Transmit Power Control Among Repeated Resource Allocation

As described above, in the conventional system, in order to secure high transmission reliability, it is available to use the same resource allocation repeatedly.

In order to reduce latency occurred in such a repetition transmission, it is required to transmit several PUSCHs in a slot using a symbol interval, which is not a slot interval or consecutive symbols for the repetition transmission.

In performing the repetition transmission of PUSCH, it is required a method for representing a repetition count of PUSCH dynamically. When operation of indicating/configuring the repetition count of PUSCH dynamically is allowed, a base station may indicate/configure the repetition count of PUSCH with PUSCH resource allocation simultaneously.

In this case, the base station may select a size and Modulation and Coding Scheme (MCS) of the PUSCH resource allocation considering the repetition count of PUSCH. Furthermore, when the PUSCH repetition transmission is considered, a transmission power of the UE may be determined depending on the number of the repetition transmissions.

Hereinafter, a detailed method for determining a transmission power of UE is described.

(Method 6)

In the case that a base station indicates or configures the number of PUSCH repetition transmissions to a UE through L1 signaling or higher layer signaling, the base station may configure a predetermined separate power control parameter for each of transmissions of the PUSCH repetition transmissions or a transmission corresponding to a group including a part of the repetition transmissions, and by using it, the UE may perform a transmission by allocating independent power for each transmission (group).

The power control parameter may be a power offset value determined based on the case that the repetition transmission count is 1 or may be configured with each parameter p0, alpha, for example, which is similar to the existing power control parameter.

Alternatively, a process of closed loop may be differently configured for each repetition transmission. For example, in the case that a beam is different or in the case of a transmission in multi-TRP (multi-Tx/Rx Point), the closed loop may be differently configured. The closed loop may be differently configured when resources are configured (e.g., transmission power control (TPC) process for each resource and/or parameter may be differently configured), the closed loop may be differently configured depending on the PUSCH repetition transmission count, or the closed loop may be differently configured depending on an RV value.

(Method 7)

In the case that a base station indicates or configures the number of PUSCH repetition transmissions to a UE through L1 signaling or higher layer signaling, the UE may control a transmission power of each PUSCH transmission in a specific rate considering the number K of repetition transmissions. In this case, the specific rate may be K*alpha, and the alpha may be a value that the base station indicates or configures to the UE through L1 signaling or higher layer signaling.

According to methods 6 and 7 described above, a transmission power is scaled in the situation of the PUSCH repetition transmission and total power consumption used for a PUSCH is similar regardless of the number PUSCH of repetition transmissions. Particularly, in the case that a plurality of PUSCH repetition transmissions is used in a slot, through the method, a dynamic power control may be performed such that a PUSCH of short duration is transmitted with high power, and a PUSCH of long duration is transmitted with low power.

Methods 6 and 7 described above has an effect that efficient power control is available in the case that a wide width of power control is required for UL multiplexing in inter-UE situation.

When the PUSCH repetition transmission is performed, in order to satisfy URLLC requirement condition, a part of PUSCH resources used for the PUSCH repetition transmission may be allocated for a PUSCH resource used by another UE. Similarly, the PUSCH resources used for the repetition transmission may be allocated for a PUSCH resource used by another UE. In this case, in order to secure reliability of PUSCH, it is required to increase a transmission power of a specific PUSCH or decrease a transmission power of other overlapped PUSCH.

Hereinafter, a method for controlling a transmission power of an overlapped PUSCH is described.

(Method 8)

A base station may indicate or configure the number of PUSCH repetition transmissions to a UE through L1 signaling or higher layer signaling, and simultaneously, the base station may indicate or configure a transmission power offset which is applicable to a part of PUSCH repetition transmissions to the UE through L1 signaling or higher layer signaling.

A part of PUSCH repetition transmissions to which the transmission power offset is applied may also be predefined in a form of index set or pattern of repetition transmission or may be indicated or configured to the UE through L1 signaling or higher layer signaling. When the UE performs the PUSCH repetition transmission, the UE may determine the transmission power of each PUSCH based on the indication/configuration information received from the base station.

(Method 9)

A base station may indicate or configure the number of PUSCH repetition transmissions to a UE through L1 signaling or higher layer signaling, and simultaneously, the base station may indicate or configure an additional or separately applicable transmission power offset to the UE through L1 signaling or higher layer signaling in a specific time and/or frequency domain.

When the UE performs the PUSCH repetition transmission, in the case that each of the PUSCH repetition transmissions or a transmission corresponding to a group constructed with a part of the repetition transmissions is performed on a resource element included in the specific time and/or frequency domain, the UE may apply the transmission power offset to the PUSCH transmission and determine the transmission power of PUSCH.

For example, in the case that a network configures a resource for a configured grant to the UE using a short periodicity, in consideration of multiplexing with eMBB data, high transmission power may be set for the configured grant.

However, such a method may increase power consumption of UE, and there is a problem that the method may cause inter-cell interference. Accordingly, in the case that the UE schedules potential eMBB/URLLC multiplexing or a configured grant resource to another UE with a UL grant, the base station may control a transmission power by distinguishing the configured grant resources for each resource type into resources of which possibility of multiplexing with a UL grant is high or low.

In other words, a transmission power may set to high for the resource of which possibility of multiplexing is high and may set to low for otherwise case. Therefore, even in the case that multiplexing is performed, when URLLC transmission is performed, there is an effect that reliability of URLLC may not be harmed, multiplexing possibility may be increased, and inter-cell interference may be reduced. Furthermore, different powers may be configured for each slot, PUSCH resource or frequency domain. In this case, a parameter for configuring power may be present, and such a parameter may be power parameters potentially including TPC process ID.

A UE may receive a specific time/frequency resource domain in which the parameter or separate offset and transmission power may be controlled for transmission power control in the specific time/frequency resource domain.

In the case that the specific time/frequency resource domain received from the base station is overlapped with a preconfigured resource, the UE may control a transmission power of a specific resource domain by using the parameter or offset. For example, a specific time/frequency resource may be informed to the UE for a PUSCH transmission for URLLC transmission, and in the case that the specific time/frequency resource is overlapped with a resource for eMBB transmission, the UE may perform the transmission by increasing transmission powers of all of the specific time/frequency resource domain received from the base station or perform the transmission by increasing transmission power only in the overlapped resource area. Accordingly, URLLC reliability may be secured.

In this case, the transmission power of the specific time/frequency resource may be determined/calculated by using the parameter or offset received from the base station.

That is, the UE operates in low mode normally, but when the UE is configured with a specific resource area to which higher transmission power is applied from the base station, the UE may be changed to high mode and perform a PUSCH transmission.

Precoder/Beam Cycling Among Repeated Resource Allocation

As described above, in the conventional system, it is available to use the same resource allocation repeatedly for a PUSCH transmission to secure higher transmission reliability. In addition, in order to reliability in various aspects in which repetition transmission, different precoder or different beam may be used for every repetition transmission.

(Method 10)

For PUSCH repetition transmission, a base station may indicate or configure precoder/beam to be used for each PUSCH transmission explicitly to a UE.

In this case, in order to reduce signaling overhead, sequence/pattern of one or a plurality of precoders/beams to be used for every PUSCH transmission may be predefined or configured to the UE by the base station. At this time, in the case that a plurality of precoders/sequence of beams is configured, the base station may indicate or configure a single precoder/sequence of beams through L1 signaling and/or higher layer signaling (e.g., TPMI field of DCI).

This method may be changed depending on a PUSCH repetition transmission count which is indicated or configured for the UE. For example, in each of the case that the PUSCH repetition transmission count is indicated or configured by 1 for the UE, the case that the repetition transmission count is not indicated or configured, the case that the PUSCH repetition transmission count is indicated or configured by a value greater than 1, and the case that the repetition transmission count is simply configured, the UE may refer to different table/configuration in interpreting values such as TPMI field indicated when resources are allocated. In other words, the UE may refer to different higher layer parameter set for precoder/beam selection for the case that the PUSCH repetition transmission is indicated or configured, and not configured.

(Method 11)

When precoder/beam to be used for each of PUSCHs of the PUSCH repetition transmission is indicated or configured explicitly to a UE by a base station, an order of repetition transmission may be considered.

When the UE performs a repetition transmission, a part of PUSCH repetition transmission may be excluded according to a configuration or indication of the base station such as TDD configuration. When a part of PUSCH repetition transmission is excluded, in the case that a sequence/pattern of precoder/beam is provided from the base station, the UE may apply sequence/pattern by excluding the excluded PUSCH transmission when the UE applies sequence/pattern of the precoder/beam.

This may prevent a specific value in the pattern from being continually excluded when the UE applies sequence/pattern of the precoder/beam, and accordingly, there in an effect that a UE operation in accordance with precoder/beam cycling purpose may be guaranteed.

The method or operation of the invention has been described in the aspect of "UE" or "base station", but the method or operation of the invention may be performed or implemented by a transmission or reception device, a (digital signal) processor, a microprocessor, and the like, instead of the "UE" and "base station". In addition, the "UE" is a general term and may be used interchangeably with a device having mobility such as a mobile station (MS), a user equipment (UE) and a mobile terminal. The "base station" is a general term and may be used interchangeably with a device such as a base station (BS), an evolved NodeB (eNB), a next generation eNode B (ng-eNB), and a next generation NodeB (gNB).

Since the examples of the proposed method described above may be included as one of the implementation methods of the present disclosure, it is apparent fact that the examples of the proposed method may be regarded as a sort of proposed methods. Furthermore, the proposed methods described above may be independently implemented, but may also be implemented in a combination (or merge) form. A rule may be defined such that a base station may inform information on whether to apply the proposed methods (or information for rules of the proposed methods) to a UE through a predefined signal (e.g., physical layer signal or higher layer signal). In addition, the proposed method described in the methods of the present disclosure or the methods extendible from the method may be implemented as a device, and the present disclosure also includes a content for the device implementing the proposed method. The description for the device is described below with reference to drawings.

A UE/base station described in the present disclosure may be substituted and applied to various devices as shown in FIG. 12 to FIG. 16.

FIG. 10 is a flowchart illustrating an example of a UE operation method performing a method for transmitting data on a physical shared channel proposed in the present disclosure.

First, a UE receives configuration information including mapping information from a base station (step, S1010).

The UE receives resource allocation information related to a first physical shared channel allocated to transmit the data from the base station (step, S1020).

The UE transmits the data using the allocated first physical shared channel to the base station (step, S1030).

In this case, the data may be transmitted repeatedly as much as the number of the first physical shared channel on a physical shared channel group including a predetermined number of the first physical shared channels.

A first dedicated demodulation-Reference Signal (DMRS) for the data may be mapped to a symbol constructing the physical shared channel group according to the mapping information and transmitted to the base station.

The mapping information may be information for mapping a second DMRS for a second physical shared channel including symbols of a same number as a symbol number constructing the physical shared channel group.

The data may be transmitted on a slot.

The first physical shared channel may include one or more consecutive symbols.

The first DMRS may be mapped only to a symbol constructing a specific physical shared channel among the first physical shared channels which are transmitted repeatedly in the physical shared channel group.

In the case that the physical shared channel group includes two first physical shared channels, and the mapping information is applicable only to the physical shared channel transmitted first among the first physical shared channels which are transmitted repeatedly in the physical shared channel group, the first DMRS may be mapped to a symbol constructing a symbol constructing the physical shared channel transmitted first, and a position of the symbol to which the first DMRS is mapped and the corresponding position may be mapped to a DMRS in the physical shared channel transmitted second among the first physical shared channels which are transmitted repeatedly in the physical shared channel group.

In this case, the mapping information may include information for a position of a specific symbol to which the first DMRS is mapped.

Meanwhile, in the case that the physical shared channel group is configured on a plurality of slots, the mapping information may include information for a position of a specific slot to which the first DMRS is mapped.

With reference to FIG. 12 to FIG. 16, it is described a UE for transmitting data on a physical shared channel in a wireless communication system proposed in the present disclosure.

A UE may include a transceiver for transmitting and receiving a radio signal; and a processor functionally connected to the transceiver.

First, the processor of the UE controls the transceiver so as to receive configuration information including mapping information from a base station.

The processor of the UE controls the transceiver so as to receive resource allocation information related to a first physical shared channel allocated to transmit the data.

The processor of the UE controls the transceiver so as to transmit the data using the allocated first physical shared channel to the base station.

In this case, the data may be transmitted repeatedly as much as the number of the first physical shared channel on a physical shared channel group including a predetermined number of the first physical shared channels.

A first dedicated demodulation-Reference Signal (DMRS) for the data may be mapped to a symbol constructing the physical shared channel group according to the mapping information and transmitted to the base station.

The mapping information may be information for mapping a second DMRS for a second physical shared channel including symbols of a same number as a symbol number constructing the physical shared channel group.

The data may be transmitted on a slot.

The first physical shared channel may include one or more consecutive symbols.

The first DMRS may be mapped only to a symbol constructing a specific physical shared channel among the first physical shared channels which are transmitted repeatedly in the physical shared channel group.

In the case that the physical shared channel group includes two first physical shared channels, and the mapping information is applicable only to the physical shared channel transmitted first among the first physical shared channels which are transmitted repeatedly in the physical shared channel group, the first DMRS may be mapped to a symbol constructing a symbol constructing the physical shared channel transmitted first, and a position of the symbol to which the first DMRS is mapped and the corresponding position may be mapped to a DMRS in the physical shared channel transmitted second among the first physical shared channels which are transmitted repeatedly in the physical shared channel group.

The mapping information may include information for a position of a specific symbol to which the first DMRS is mapped.

In the case that the physical shared channel group is configured on a plurality of slots, the mapping information may include information for a position of a specific slot to which the first DMRS is mapped.

FIG. 11 is a flowchart illustrating an example of a base station operation method performing a method for receiving data transmitted on a physical shared channel proposed in the present disclosure.

First, a base station transmits configuration information including mapping information to a UE (step, S1110).

The base station transmits resource allocation information related to a first physical shared channel allocated to transmit the data to the UE (step, S1120).

The base station receives the data transmitted using the allocated first physical shared channel from the UE (step, S1130).

In this case, the data may be transmitted repeatedly as much as the number of the first physical shared channel on a physical shared channel group including a predetermined number of the first physical shared channels.

A first dedicated demodulation-Reference Signal (DMRS) for the data may be mapped to a symbol constructing the physical shared channel group according to the mapping information and transmitted to the base station.

The mapping information may be information for mapping a second DMRS for a second physical shared channel including symbols of a same number as a symbol number constructing the physical shared channel group.

With reference to FIG. 12 to FIG. 16, it is described a base station for receiving data transmitted on a physical shared channel in a wireless communication system proposed in the present disclosure.

A base station may include a transceiver for transmitting and receiving a radio signal; and a processor functionally connected to the transceiver.

First, the processor of the base station controls the transceiver so as to transmit configuration information including mapping information to a UE.

The processor of the base station controls the transceiver so as to transmit resource allocation information related to a first physical shared channel allocated to transmit the data to the UE.

The processor of the base station controls the transceiver so as to receive the data transmitted using the allocated first physical shared channel from the UE.

In this case, the data may be transmitted repeatedly as much as the number of the first physical shared channel on a physical shared channel group including a predetermined number of the first physical shared channels.

A first dedicated demodulation-Reference Signal (DMRS) for the data may be mapped to a symbol constructing the physical shared channel group according to the mapping information and transmitted to the base station.

The mapping information may be information for mapping a second DMRS for a second physical shared channel including symbols of a same number as a symbol number constructing the physical shared channel group.

An example of communication system to which the present disclosure is applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 12 illustrates a communication system 10000 applied to the present disclosure.

Referring to FIG. 12, a communication system 10000 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 10000a, vehicles 10000b-1 and 10000b-2, an eXtended Reality (XR) device 10000c, a hand-held device 10000d, a home appliance 10000e, an Internet of Things (IoT) device 10000f, and an Artificial Intelligence (AI) device/server 40000. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 20000a may operate as a BS/network node with respect to other wireless devices.

The wireless devices 10000a to 10000f may be connected to the network 30000 via the BSs 20000. An AI technology may be applied to the wireless devices 10000a to 10000f and the wireless devices 10000a to 10000f may be connected to the AI server 40000 via the network 30000. The network 30000 may be configured using a 3G network, a 4G (e.g., LTE) network, or a 5G (e.g., NR) network. Although the wireless devices 10000a to 10000f may communicate with each other through the BSs 20000/network 30000, the wireless devices 10000a to 10000f may perform direct communication (e.g., sidelink communication) with each other without passing through the BSs/network. For example, the vehicles 10000b-1 and 10000b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 10000a to 10000f.

Wireless communication/connections 15000a, 15000b, or 15000c may be established between the wireless devices 10000a to 10000f/BS 20000, or BS 20000/BS 20000. Herein, the wireless communication/connections may be established through various RATs (e.g., 5G NR) such as uplink/downlink communication 15000a, sidelink communication 15000b (or, D2D communication), or inter BS communication (e.g. relay, Integrated Access Backhaul (IAB)). The wireless devices and the BSs/the wireless devices may transmit/receive radio signals to/from each other through the wireless communication/connections 15000a and 15000b. For example, the wireless communication/connections 15000a and 15000b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

An Example of Wireless Device to which the Present Disclosure is Applied

FIG. 13 illustrates wireless devices applicable to the present disclosure.

Referring to FIG. 13, a first wireless device 1310 and a second wireless device 1320 may transmit radio signals through a variety of RATs (e.g., LTE and NR). Herein, {the first wireless device 1310 and the second wireless device 1320} may correspond to {the wireless device 10000x and the BS 20000} and/or {the wireless device 10000x and the wireless device 10000x} of FIG. 12.

The first wireless device 1310 may include one or more processors 1312 and one or more memories 1314 and additionally further include one or more transceivers 1316 and/or one or more antennas 1318. The processor(s) 1312 may control the memory(s) 1314 and/or the transceiver(s) 1316 and may be configured to implement the descriptions, functions, procedures, proposals, methods, and/or operational flowcharts disclosed in this document. For example, the processor(s) 1312 may process information within the memory(s) 1314 to generate first information/signals and then transmit radio signals including the first information/signals through the transceiver(s) 1316. The processor(s) 1312 may receive radio signals including second information/signals through the transceiver 1316 and then store information obtained by processing the second information/signals in the memory(s) 1314. The memory(s) 1314 may be connected to the processor(s) 1312 and may store a variety of information related to operations of the processor(s) 1312. For example, the memory(s) 1314 may store software code including commands for performing a part or the entirety of processes controlled by the processor(s) 1312 or for performing the descriptions, functions, procedures, proposals, methods, and/or operational flowcharts disclosed in this document. Herein, the processor(s) 1312 and the memory(s) 1314 may be a part of a communication modem/circuit/chip designed to implement RAT (e.g., LTE or NR). The transceiver(s) 1316 may be connected to the processor(s) 1312 and transmit and/or receive radio signals through one or more antennas 1318. Each of the transceiver(s) 1316 may include a transmitter and/or a receiver. The transceiver(s) 1316 may be interchangeably used with Radio Frequency (RF) unit(s). In the present disclosure, the wireless device may represent a communication modem/circuit/chip.

The second wireless device 1320 may include one or more processors 1322 and one or more memories 1324 and additionally further include one or more transceivers 1326 and/or one or more antennas 1328. The processor(s) 1322 may control the memory(s) 1324 and/or the transceiver(s) 1326 and may be configured to implement the descriptions, functions, procedures, proposals, methods, and/or operational flowcharts disclosed in this document. For example, the processor(s) 1322 may process information within the memory(s) 1324 to generate third information/signals and then transmit radio signals including the third information/signals through the transceiver(s) 1326. The processor(s) 1322 may receive radio signals including fourth information/signals through the transceiver(s) 1326 and then store information obtained by processing the fourth information/signals in the memory(s) 1324. The memory(s) 1324 may be connected to the processor(s) 1322 and may store a variety of information related to operations of the processor(s) 1322. For example, the memory(s) 1324 may store software code including commands for performing a part or the entirety of processes controlled by the processor(s) 1322 or for performing the descriptions, functions, procedures, proposals, methods, and/or operational flowcharts disclosed in this document. Herein, the processor(s) 1322 and the memory(s) 1324 may be a part of a communication modem/circuit/chip designed to implement RAT (e.g., LTE or NR). The transceiver(s) 1326 may be connected to the processor(s) 1322 and transmit and/or receive radio signals through one or more antennas 1328. Each of the transceiver(s) 1326 may include a transmitter and/or a receiver. The transceiver(s) 1326 may be interchangeably used with RF unit(s). In the present disclosure, the wireless device may represent a communication modem/circuit/chip.

Hereinafter, hardware elements of the wireless devices 1310 and 1320 will be described more specifically. One or more protocol layers may be implemented by, without being limited to, one or more processors 1312 and 1322. For example, the one or more processors 1312 and 1322 may implement one or more layers (e.g., functional layers such as PHY, MAC, RLC, PDCP, RRC, and SDAP). The one or more processors 1312 and 1322 may generate one or more Protocol Data Units (PDUs) and/or one or more Service Data Unit (SDUs) according to the descriptions, functions, procedures, proposals, methods, and/or operational flowcharts disclosed in this document. The one or more processors 1312 and 1322 may generate messages, control information, data, or information according to the descriptions, functions, procedures, proposals, methods, and/or operational flowcharts disclosed in this document. The one or more processors 1312 and 1322 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 1316 and 1326. The one or more processors 1312 and 1322 may receive the signals (e.g., baseband signals) from the one or more transceivers 1316 and 1326 and acquire the PDUs, SDUs, messages, control information, data, or information according to the descriptions, functions, procedures, proposals, methods, and/or operational flowcharts disclosed in this document.

The one or more processors 1312 and 1322 may be referred to as controllers, microcontrollers, microprocessors, or microcomputers. The one or more processors 1312 and 1322 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 1312 and 1322. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 1312 and 1322 or stored in the one or more memories 1314 and 1324 so as to be driven by the one or more processors 1312 and 1322. The descriptions, functions, procedures, proposals, methods, and/or operational flowcharts disclosed in this document may be implemented using firmware or software in the form of code, commands, and/or a set of commands.

The one or more memories 1314 and 1324 may be connected to the one or more processors 1312 and 1322 and store various types of data, signals, messages, information, programs, code, instructions, and/or commands. The one or more memories 1314 and 1324 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 1314 and 1324 may be located at the interior and/or exterior of the one or more processors 1312 and 1322. The one or more memories 1314 and 1324 may be connected to the one or more processors 1312 and 1322 through various technologies such as wired or wireless connection.

The one or more transceivers 1316 and 1326 may transmit user data, control information, and/or radio signals/channels, mentioned in the methods and/or operational flowcharts of this document, to one or more other devices. The one or more transceivers 1316 and 1326 may receive user data, control information, and/or radio signals/channels, mentioned in the descriptions, functions, procedures, proposals, methods, and/or operational flowcharts disclosed in this document, from one or more other devices. For example, the one or more transceivers 1316 and 1326 may be connected to the one or more processors 1312 and 1322 and transmit and receive radio signals. For example, the one or more processors 1312 and 1322 may perform control so that the one or more transceivers 1316 and 1326 may transmit user data, control information, or radio signals to one or more other devices. The one or more processors 1312 and 1322 may perform control so that the one or more transceivers 1316 and 1326 may receive user data, control information, or radio signals from one or more other devices. The one or more transceivers 1316 and 1326 may be connected to the one or more antennas 1318 and 1328 and the one or more transceivers 1316 and 1326 may be configured to transmit and receive user data, control information, and/or radio signals/channels, mentioned in the descriptions, functions, procedures, proposals, methods, and/or operational flowcharts disclosed in this document, through the one or more antennas 1318 and 1328. In this document, the one or more antennas may be a plurality of physical antennas or a plurality of logical antennas (e.g., antenna ports). The one or more transceivers 1316 and 1326 may convert received radio signals/channels etc. from RF band signals into baseband signals in order to process received user data, control information, radio signals/channels, etc. using the one or more processors 1312 and 1322. The one or more transceivers 1316 and 1326 may convert the user data, control information, radio signals/channels, etc. processed using the one or more processors 1312 and 1322 from the base band signals into the RF band signals. To this end, the one or more transceivers 1316 and 1326 may include (analog) oscillators and/or filters.

An Example of Signal Processing Circuit to which the Present Disclosure is Applied FIG. 14 illustrates a signal process circuit for a transmission signal.

Referring to FIG. 14, a signal processing circuit 1400 may include scramblers 1410, modulators 1420, a layer mapper 1430, a precoder 1440, resource mappers 1450, and signal generators 1460. An operation/function of FIG. 14 may be performed, without being limited to, the processors 1312 and 1322 and/or the transceivers 1316 and 1326 of FIG. 13. Hardware elements of FIG. 14 may be implemented by the processors 1312 and 1322 and/or the transceivers 1316 and 1326 of FIG. 13. For example, blocks 1410 to 1460 may be implemented by the processors 1312 and 1322 of FIG. 13. Alternatively, the blocks 1410 to 1450 may be implemented by the processors 1312 and 1322 of FIG. 13 and the block 1460 may be implemented by the transceivers 1316 and 1326 of FIG. 13.

Codewords may be converted into radio signals via the signal processing circuit 1400 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1410. Scramble sequences used for scrambling may be generated based on an initialization value, and the initialization value may include ID information of a wireless device. The scrambled bit sequences may be modulated to modulation symbol sequences by the modulators 1420. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1430. Modulation symbols of each transport layer may be mapped (precoded) to corresponding antenna port(s) by the precoder 1440. Outputs z of the precoder 1440 may be obtained by multiplying outputs y of the layer mapper 1430 by an N*M precoding matrix W. Herein, N is the number of antenna ports and M is the number of transport layers. The precoder 1440 may perform precoding after performing transform precoding (e.g., DFT) for complex modulation symbols. Alternatively, the precoder 1440 may perform precoding without performing transform precoding.

The resource mappers 1450 may map modulation symbols of each antenna port to time-frequency resources. The time-frequency resources may include a plurality of symbols (e.g., a CP-OFDMA symbols and DFT-s-OFDMA symbols)

in the time domain and a plurality of subcarriers in the frequency domain. The signal generators 1460 may generate radio signals from the mapped modulation symbols and the generated radio signals may be transmitted to other devices through each antenna. For this purpose, the signal generators 1460 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1410 to 1460 of FIG. 14. For example, the wireless devices (e.g., 1310 and 1320 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

An Example of Wireless Device Application to which the Present Disclosure is Applied FIG. 15 illustrates another example of a wireless device applied to the present invention. The wireless device may be implemented in various forms according to a use-case/service.

Referring to FIG. 15, wireless devices 1310 and 1320 may correspond to the wireless devices 1310 and 1320 of FIG. 13 and may be configured by various elements, components, units/portions, and/or modules. For example, each of the wireless devices 1310 and 1320 may include a communication unit 1510, a control unit 1520, a memory unit 1530, and additional components 1540. The communication unit may include a communication circuit 1512 and transceiver(s) 1514. For example, the communication circuit 1512 may include the one or more processors 1312 and 1322 and/or the one or more memories 1314 and 1324 of FIG. 13. For example, the transceiver(s) 1514 may include the one or more transceivers 1316 and 1326 and/or the one or more antennas 1318 and 1328 of FIG. 13. The control unit 1520 is electrically connected to the communication unit 1510, the memory 1530, and the additional components 1540 and controls overall operation of the wireless devices. For example, the control unit 1520 may control an electric/mechanical operation of the wireless device based on programs/code/commands/information stored in the memory unit 1530. The control unit 1520 may transmit the information stored in the memory unit 1530 to the exterior (e.g., other communication devices) via the communication unit 1510 through a wireless/wired interface or store, in the memory unit 1530, information received through the wireless/wired interface from the exterior (e.g., other communication devices) via the communication unit 1510.

The additional components 1540 may be variously configured according to types of wireless devices. For example, the additional components 1540 may include at least one of a power unit/battery, input/output (I/O) unit, a driving unit, and a computing unit. The wireless device may be implemented in the form of, without being limited to, the robot (10000*a* of FIG. 12), the vehicles (10000*b*-1 and 10000*b*-2 of FIG. 12), the XR device (10000*c* of FIG. 12), the hand-held device (10000*d* of FIG. 12), the home appliance (10000*e* of FIG. 12), the IoT device (10000*f* of FIG. 12), a digital broadcast terminal, a hologram device, a public safety device, an MTC device, a medicine device, a fintech device (or a finance device), a security device, a climate/environment device, the AI server/device (40000 of FIG. 12), the BSs (20000 of FIG. 12), a network node, etc. The wireless device may be used in a mobile or fixed place according to a use-example/service.

In FIG. 15, the entirety of the various elements, components, units/portions, and/or modules in the wireless devices 1310 and 1320 may be connected to each other through a wired interface or at least a part thereof may be wirelessly connected through the communication unit 1510. For example, in each of the wireless devices 1310 and 1320, the control unit 1520 and the communication unit 1510 may be connected by wire and the control unit 1520 and first units (e.g., 1530 and 1540) may be wirelessly connected through the communication unit 1510. Each element, component, unit/portion, and/or module within the wireless devices 1310 and 1320 may further include one or more elements. For example, the control unit 1520 may be configured by a set of one or more processors. As an example, the control unit 1520 may be configured by a set of a communication control processor, an application processor, an Electronic Control Unit (ECU), a graphical processing unit, and a memory control processor. As another example, the memory 1530 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

An Example of Portable Device to which the Present Disclosure is Applied

FIG. 16 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 1310 may include an antenna unit 1318, a communication unit 1510, a control unit 1520, a memory unit 1530, a power supply unit 1540*a*, an interface unit 1540*b*, and an I/O unit 1540*c*. The antenna unit 1318 may be configured as a part of the communication unit 1510. Blocks 1510 to 1530/1540*a* to 1540*c* correspond to the blocks 1510 to 1530/1540 of FIG. 15, respectively.

The communication unit 1510 may transmit and receive signals (e.g., data and control signals) to and from other wireless devices or BSs. The control unit 1520 may perform various operations by controlling constituent elements of the hand-held device 1310. The control unit 1520 may include an Application Processor (AP). The memory unit 1530 may store data/parameters/programs/code/commands needed to drive the hand-held device 1310. The memory unit 1530 may store input/output data/information. The power supply unit 1540*a* may supply power to the hand-held device 1310 and include a wired/wireless charging circuit, a battery, etc.

The interface unit 1540b may support connection of the hand-held device 1310 to other external devices. The interface unit 1540b may include various ports (e.g., an audio I/O port and a video I/O port) for connection with external devices. The I/O unit 1540c may input or output video information/signals, audio information/signals, data, and/or information input by a user. The I/O unit 1540c may include a camera, a microphone, a user input unit, a display unit 1540d, a speaker, and/or a haptic module.

As an example, in the case of data communication, the I/O unit 1540c may acquire information/signals (e.g., touch, text, voice, images, or video) input by a user and the acquired information/signals may be stored in the memory unit 1530. The communication unit 1510 may convert the information/signals stored in the memory into radio signals and transmit the converted radio signals to other wireless devices directly or to a BS. The communication unit 1510 may receive radio signals from other wireless devices or the BS and then restore the received radio signals into original information/signals. The restored information/signals may be stored in the memory unit 1530 and may be output as various types (e.g., text, voice, images, video, or haptic) through the I/O unit 1540c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative, but should be construed as being illustrative from all aspects. The scope of the present disclosure should be determined by reasonable analysis of the attached claims, and all changes within the equivalent range of the present disclosure are included in the scope of the present disclosure.

INDUSTRIAL APPLICABILITY

The present disclosure has been illustrated as being applied to the 3GPP LTE/LTE-A/NR system, but may be applied to various wireless communication systems in addition to the 3GPP LTE/LTE-A/NR system.

The invention claimed is:

1. A method for transmitting data on a physical shared channel in a wireless communication system, the method performed by a user equipment and comprising:
receiving, from a base station, configuration information including mapping information;
receiving, from the base station, resource allocation information related to a first physical shared channel allocated to transmit the data; and
transmitting, to the base station, the data using the allocated first physical shared channel,
wherein the data is transmitted repeatedly as much as a number of the first physical shared channel on a physical shared channel group including a predetermined number of the first physical shared channels,
wherein a first dedicated demodulation-Reference Signal (DMRS) for the data is mapped to a symbol constructing the physical shared channel group according to the mapping information and transmitted to the base station,
wherein the mapping information is information regarding mapping a second DMRS for a second physical shared channel including symbols of a same number as a symbol number constructing the physical shared channel group, and
wherein the second DMRS is transmitted only for the second physical shared channel related to a configured redundancy version (RV), and the second physical shared channel not related to the configured RV shares the first DMRS with the first physical shared channel.

2. The method of claim 1, wherein the data is transmitted on a slot.

3. The method of claim 1, wherein the first physical shared channel includes one or more consecutive symbols.

4. The method of claim 1, wherein the first DMRS is mapped only to a symbol constructing a specific physical shared channel among the first physical shared channels which are transmitted repeatedly in the physical shared channel group.

5. The method of claim 1, based on the physical shared channel group including two first physical shared channels, and the mapping information is applicable only to the physical shared channel transmitted first among the first physical shared channels which are transmitted repeatedly in the physical shared channel group,
wherein the first DMRS is mapped to a symbol constructing a symbol constructing the physical shared channel transmitted first, and
wherein a position of the symbol to which the first DMRS is mapped and the corresponding position are mapped to a DMRS in the physical shared channel transmitted second among the first physical shared channels which are transmitted repeatedly in the physical shared channel group.

6. The method of claim 1, wherein the mapping information includes information for a position of a specific symbol to which the first DMRS is mapped.

7. The method of claim 1, wherein, based on the physical shared channel group being configured on a plurality of slots, the mapping information includes information for a position of a specific slot to which the first DMRS is mapped.

8. A user equipment (UE) configured to transmit data on a physical shared channel in a wireless communication system, the UE comprising:

a transceiver configured to transmit and receive a radio signal; and a processor functionally connected to the transceiver, wherein the processor is configured to perform operations comprising:

receiving, from a base station, configuration information including mapping information;

receiving, from the base station, resource allocation information related to a first physical shared channel allocated to transmit the data; and transmitting, to the base station, the data using the allocated first physical shared channel, wherein the data is transmitted repeatedly as much as a number of the first physical shared channel on a physical shared channel group including a predetermined number of the first physical shared channels, wherein a first dedicated demodulation-Reference Signal (DMRS) for the data is mapped to a symbol constructing the physical shared channel group according to the mapping information and transmitted to the base station, wherein the mapping information is information for mapping a second DMRS for a second physical shared channel including symbols of a same number as a symbol number constructing the physical shared channel group, and wherein the second DMRS is transmitted only for the second physical shared channel related to a configured redundancy version (RV), and the second physical shared channel not related to the configured RV shares the first DMRS with the first physical shared channel.

9. The UE of claim 8, wherein the data is transmitted on a slot.

10. The UE of claim 8, wherein the first physical shared channel includes one or more consecutive symbols.

11. The UE of claim 8, wherein the first DMRS is mapped only to a symbol constructing a specific physical shared channel among the first physical shared channels which are transmitted repeatedly in the physical shared channel group.

12. The UE of claim 8, based on the physical shared channel group including two first physical shared channels, and the mapping information is applicable only to the physical shared channel transmitted first among the first physical shared channels which are transmitted repeatedly in the physical shared channel group, wherein the first DMRS is mapped to a symbol constructing a symbol constructing the physical shared channel transmitted first, and wherein a position of the symbol to which the first DMRS is mapped and the corresponding position are mapped to a DMRS in the physical shared channel transmitted second among the first physical shared channels which are transmitted repeatedly in the physical shared channel group.

13. The UE of claim 8, wherein the mapping information includes information for a position of a specific symbol to which the first DMRS is mapped.

14. The UE of claim 8, wherein, based on the physical shared channel group being configured on a plurality of slots, the mapping information includes information for a position of a specific slot to which the first DMRS is mapped.

15. A method for receiving data on a physical shared channel in a wireless communication system, the method performed by a base station and comprising:

transmitting, to a user equipment (UE), configuration information including mapping information;

transmitting, to the UE, resource allocation information related to a first physical shared channel allocated to transmit the data; and receiving, from the UE, the data transmitted using the allocated first physical shared channel, wherein the data is transmitted repeatedly as much as a number of the first physical shared channel on a physical shared channel group including a predetermined number of the first physical shared channels, wherein a first dedicated demodulation-Reference Signal (DMRS) for the data is mapped to a symbol constructing the physical shared channel group according to the mapping information and transmitted to the base station, wherein the mapping information is information for mapping a second DMRS for a second physical shared channel including symbols of a same number as a symbol number constructing the physical shared channel group, and wherein the second DMRS is transmitted only for the second physical shared channel related to a configured redundancy version (RV), and the second physical shared channel not related to the configured RV shares the first DMRS with the first physical shared channel.

* * * * *